US012345178B1

(12) United States Patent
Vondrell et al.

(10) Patent No.: US 12,345,178 B1
(45) Date of Patent: Jul. 1, 2025

(54) TURBOFAN ENGINE INCLUDING A FAN ACTUATION SYSTEM

(71) Applicant: General Electric Company, Schenectady, NY (US)

(72) Inventors: Randy M. Vondrell, Newport, KY (US); Keith A. Miedema, Fairfield, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/400,746

(22) Filed: Dec. 29, 2023

(51) Int. Cl.
*F03D 7/02* (2006.01)
*F01D 5/14* (2006.01)
(Continued)

(52) U.S. Cl.
CPC .............. *F01D 7/02* (2013.01); *F01D 5/141* (2013.01); *F01D 17/26* (2013.01); *F03D 7/0224* (2013.01);
(Continued)

(58) Field of Classification Search
CPC . F01D 7/02; F01D 5/141; F01D 17/26; F03D 7/0224; F03D 17/029; F03D 80/701; F02C 7/057; F02K 3/06
See application file for complete search history.

(56) References Cited

U.S. PATENT DOCUMENTS 3,335,960 A    8/1967 Alderson
3,637,323 A *  1/1972 Chilman ................. B64C 11/30
                                                 416/157 R (Continued)

FOREIGN PATENT DOCUMENTS

CN    104992023 A    10/2015
CN    106446466 A     2/2017
(Continued)

OTHER PUBLICATIONS

Ryan et al., Variable Pitch Fan System for NASA/NAVY Research and Technology Aircraft, Apr. 1977, NASA, p. 11 (Year: 1977).*
(Continued)

*Primary Examiner* — Topaz L. Elliot
*Assistant Examiner* — Andrew J Marien
(74) *Attorney, Agent, or Firm* — Venable LLP; Peter T. Hrubiec; Michele V. Frank

(57) ABSTRACT

A turbofan engine includes a fan and a fan actuation system. The fan has a plurality of fan blades. Each of the plurality of fan blades is rotatable about a pitch axis. The fan actuation system includes one or more actuators for rotating the plurality of fan blades about the pitch axis and one or more thrust bearings. The fan actuation system is characterized by a fan actuation system envelope in a range of 300 to 1860. The fan actuation system envelope is given by $$\frac{N_{FB} \times D_{FT} \times M_{cruise}}{\left(\frac{R_{TB}}{N_{FB}}\right)},$$

where $N_{FB}$ is a number of the plurality of fan blades, $D_{FT}$ is a fan tip diameter of the plurality of fan blades, $M_{cruise}$ is a Mach number of the turbofan engine at cruise operating conditions, and $R_{TB}$ is a thrust bearing radius of the one or more thrust bearings.

20 Claims, 8 Drawing Sheets

(51) Int. Cl.
*F01D 7/02* (2006.01)
*F01D 17/26* (2006.01)
*F03D 17/00* (2016.01)
*F03D 80/70* (2016.01)
*F02C 7/057* (2006.01)
*F02K 3/06* (2006.01)

(52) U.S. Cl.
CPC ......... *F03D 17/029* (2023.08); *F03D 80/701* (2023.08); *F02C 7/057* (2013.01); *F02K 3/06* (2013.01)

(56) References Cited

U.S. PATENT DOCUMENTS

| | | | |
|---|---|---|---|
| 3,844,680 A * | 10/1974 | Saterdal | F04D 29/362 |
| | | | 416/157 R |
| 3,922,852 A * | 12/1975 | Drabek | F01D 7/00 |
| | | | 416/165 |
| 5,282,719 A | 2/1994 | McCarty et al. | |
| 5,836,743 A * | 11/1998 | Carvalho | B64C 11/385 |
| | | | 416/157 R |
| 8,371,105 B2 | 2/2013 | Glynn et al. | |
| 8,831,913 B2 | 9/2014 | Holden et al. | |
| 10,100,653 B2 | 10/2018 | Niergarth et al. | |
| 11,236,680 B2 * | 2/2022 | Dennison | F02C 9/00 |
| 11,507,052 B2 | 11/2022 | Sykes et al. | |
| 2020/0200125 A1 * | 6/2020 | Moore | F02C 7/24 |
| 2022/0275774 A1 * | 9/2022 | Niergarth | F02K 3/06 |
| 2023/0126551 A1 * | 4/2023 | Niergarth | F02K 3/072 |
| | | | 60/226.1 |

FOREIGN PATENT DOCUMENTS

| | | |
|---|---|---|
| CN | 108595755 A | 9/2018 |
| CN | 109815528 A | 5/2019 |
| EP | 3671391 A1 | 6/2020 |
| FR | 3127269 A1 | 3/2023 |
| FR | 3130896 A1 | 6/2023 |
| FR | 3130897 A1 | 6/2023 |
| FR | 3133367 A1 | 9/2023 |
| FR | 3133368 A1 | 9/2023 |

OTHER PUBLICATIONS

Grooms et al., U.S. Appl. No. 18/184,785, filed Mar. 16, 2023.
Hunter, U.S. Appl. No. 18/327,629, filed Jun. 1, 2023.

* cited by examiner

TURBOFAN ENGINE INCLUDING A FAN ACTUATION SYSTEM

TECHNICAL FIELD

The present disclosure relates generally to fan actuation systems for turbofan engines.

BACKGROUND

Turbofan engines, for example, for an aircraft, generally include a fan having fan blades and a turbo-engine arranged in flow communication with one another. Some turbofan engines include a fan actuation system for actuating the fan blades of the fan.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
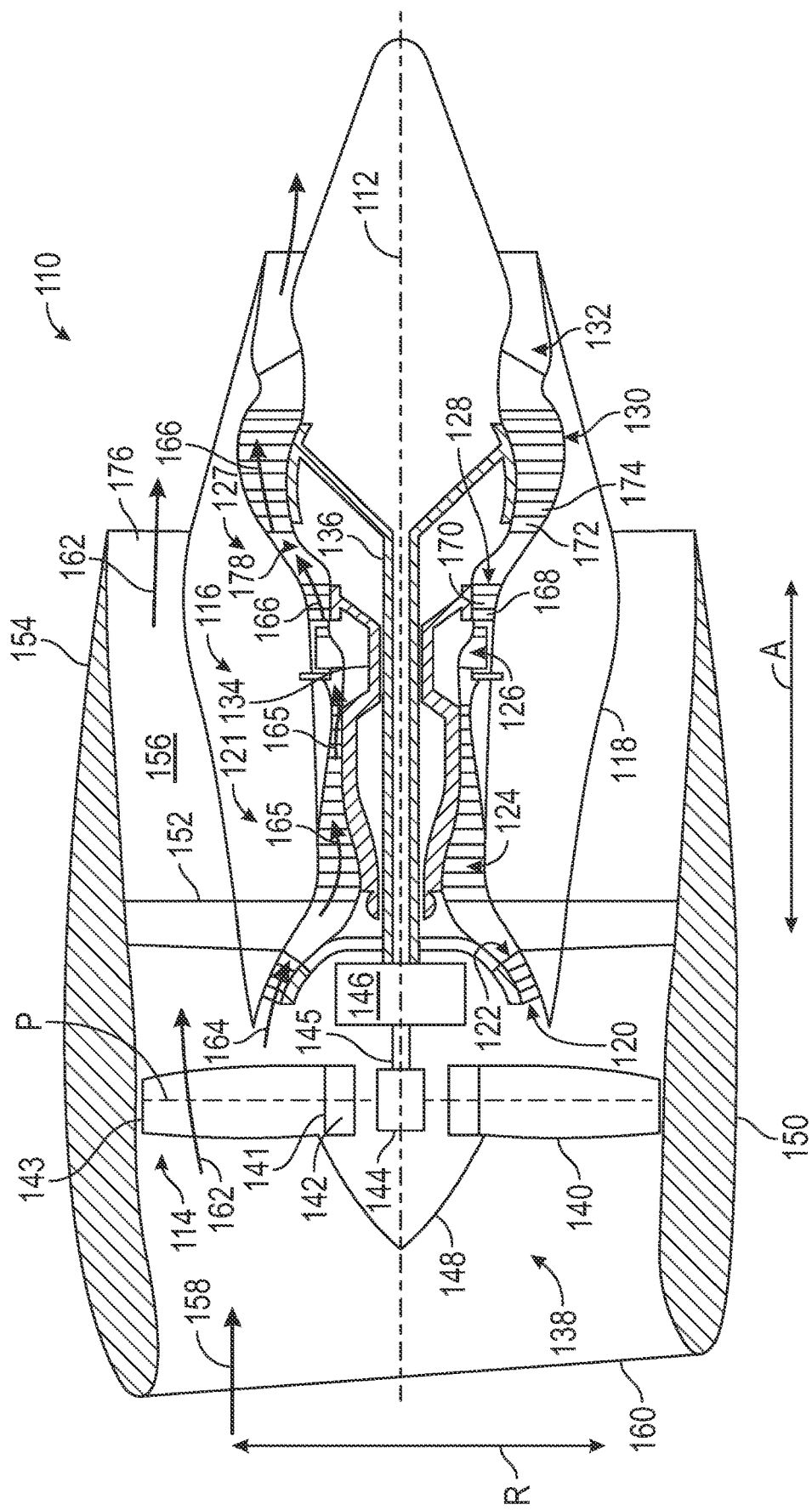
FIG. 1 is a schematic cross-sectional diagram of a turbofan engine, taken along a longitudinal centerline axis of the turbofan engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbofan engine or vehicle, and refer to the normal operational attitude of the turbofan engine or vehicle. For example, with regard to a turbofan engine, forward refers to a position closer to an engine inlet and aft refers to a position closer to an engine nozzle or exhaust.

As used herein, the terms "low," "mid" (or "mid-level"), and "high," or their respective comparative degrees (e.g., "lower" and "higher", where applicable), when used with compressor, combustor, turbine, shaft, fan, or turbofan engine components, each refers to relative pressures, relative speeds, relative temperatures, or relative power outputs within an engine unless otherwise specified. For example, a "low-power" setting defines the engine or the combustor configured to operate at a power output lower than a "high-power" setting of the engine or the combustor, and a "mid-level power" setting defines the engine or the combustor configured to operate at a power output higher than a "low-power" setting and lower than a "high-power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine. A mission cycle for a turbofan engine includes, for example, a low-power operation, a mid-level power operation, and a high-power operation. Low-power operation includes, for example, engine start, idle, taxiing, and approach. Mid-level power operation includes, for example, cruise. High-power operation includes, for example, takeoff and climb.

The various power levels of the turbofan engine are defined as a percentage of a sea level static (SLS) maximum engine rated thrust. Low power operation includes, for example, less than thirty percent (30%) of the SLS maximum engine rated thrust of the turbofan engine. Mid-level power operation includes, for example, thirty percent (30%) to eighty-five percent (85%) of the SLS maximum engine rated thrust of the turbofan engine. High power operation includes, for example, greater than eighty-five percent (85%) of the SLS maximum engine rated thrust of the turbofan engine. The values of the thrust for each of the low power operation, the mid-level power operation, and the high power operation of the turbofan engine are exemplary only, and other values of the thrust can be used to define the low power operation, the mid-level power operation, and the high power operation.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbofan engine. Moreover, the terms "radial" and "radially" refer to directions and orientations that extend substantially perpendicular to the centerline of the turbofan engine. In addition, as used herein, the terms "circumferential" and "circumferentially" refer to directions and orientations that extend arcuately about the centerline of the turbofan engine.

As used herein, a "turbo-engine" includes a compressor section, a combustion section, and a turbine section.

As used herein, a "turbofan engine" includes a turbo-engine and a fan that directs air into the turbo-engine, and rated for use in a regional aircraft, narrow body aircraft, or wide body aircraft. A turbofan engine rated for use on a regional aircraft will have a maximum takeoff thrust in a range of ten thousand pound-force to twenty thousand pound-force (10,000 lbf to 20,000 lbf). A turbofan engine rated for use on a narrow body aircraft will have a maximum takeoff thrust in a range of fifteen thousand pound-force to thirty thousand pound-force (15,000 lbf to 30,000 lbf). A turbofan engine rated for use on a wide body aircraft will have a maximum takeoff thrust in a range of forty thousand pound-force to one hundred ten thousand pound-force (40,000 lbf to 110,000 lbf).

As used herein, the term "ducted engine" means a turbofan engine with a fan casing or nacelle that circumferentially surrounds the fan.

As used herein, an "unducted fan engine" or an "open fan engine" means a turbofan engine without a fan casing or a nacelle surrounding the fan.

Hereafter, the term "turbofan engine" will refer to either a "ducted engine" or an "open fan engine."

As used herein, a "fan tip diameter" is defined as a diameter of a fan blade and is measured from the longitudinal centerline axis of the turbofan engine to a fan tip of the fan blade.

As used herein, a Mach number is a ratio of the speed of the turbofan engine (of the aircraft) to the speed of sound in the surrounding airflow.

As used herein, a "thrust bearing radius" of a thrust bearing is defined in the radial direction from the longitudinal centerline axis to a radial center of the thrust bearing.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The present disclosure provides for turbofan engines that have a variable pitch fan. Such engines include a fan actuation system that includes one or more actuators for changing a pitch of fan blades of the variable pitch fan. The fan actuation system typically includes a hydraulic system that supplies hydraulic fluid to one or more chambers to actuate the actuators. The actuators are coupled to the fan blades and actuation of the actuators causes the fan blades to rotate about a pitch axis P to change the pitch of the fan blades. Some fan actuation systems are designed for turboprop engines that include a propeller, rather than a fan.

Turboprop engines produce less thrust than turbofan engines. Turboprop engines typically provide cruise speeds for an aircraft with a Mach number that is less than 0.7 and have fewer than ten propeller blades, such as fewer than eight propeller blades or fewer than five propeller blades. Turbofan engines include ten or more fan blades that extend from a disk and provide cruise speeds for an aircraft with a Mach number that is 0.7 or greater. To achieve these higher speeds, the fan aerodynamics for the turbofan engines are different than the propeller aerodynamics for turboprop engines, resulting in the turbofan engines having more fan blades for aerodynamic efficiency at higher Mach speeds.

Turbofan engines with variable pitch fan blades also benefit from guide vanes, such as outlet guide vanes behind the fan blades, and/or inlet guide vanes forward of the fan, to reduce losses at higher speeds.

The loading environment associated with the variable pitch mechanism for turboprop engines is less than the loading environment presented for a variable pitch turbofan engine. There is a lower disk loading capability requirement on parts (e.g., trunnion, bearings, gearing, actuators, etc.) and associated less actuation force resources needed (e.g., hydraulic fluid) to operate a variable pitch turboprop as compared to a variable pitch turbofan engine. At the same time, the available space, the desirable space, or the volume in that part of the engine for the higher-load-carrying fan blade pitch actuation system and the greater number of blades of a turbofan engine is not correspondingly larger than the space available for the lower-load-carrying fan blade pitch actuation system with fewer fan blades of a turboprop. Turbofan engines having variable pitch fan blades require more compactness for the pitch change system, relative to a turboprop, when considering the larger space requirements assumed if one were to simply scale-up a pitch actuation system for a turboprop for use in a turbofan engine. This can be realized when one considers that a larger, stronger structure is needed to support the more numerous blades and react the higher pitch loads associated with a turbofan engine. One cannot simply scale-up the space available for a pitch change mechanism and associated structure, and also scale up to account for the impact of a significantly increased number of blades when designing a variable pitch turbofan engine. Accommodation of the pitch change mechanism, trunnion, and associated structure for holding and articulating the fan blades within an engine housing therefore presents unique challenges for the turbofan engine in terms of the available space. The existing pitch change mechanisms and structure used to support blades in turboprop engines are not faced with similar challenges and therefore provide limited insight into how to implement a variable pitch mechanism within the more limited space, and more numerous fan blade system of a turbofan engine.

Many actuation systems for turboprop engines include a counterweight system to help pitch the propeller blades (e.g., the weight counteracts inertial loading associated with turning the propeller blade). For turbofan engines, a counterweight system may not be feasible because there is not the space available to accommodate the counterweight system. Thus, an alternative is needed to articulate the blades without exceeding load limits, which implies more compactness given the limited space available. Additionally, it was realized that pitch lock devices to lock the more-numerous fan blades in a feather position for turbofan engines, in case of fan actuation system failure, need to be considered when determining the minimum size needed for the turbofan engine fan actuation system. Additionally, it should be realized the very different types of inlets between a turboprop engine, on the one hand, and turbofan engine on the other hand, impact the amount of available space within the engine housing. Inlets to the turbo-engine (e.g., the compressor section, the combustion section, and the turbine section) of a turboprop engine have a relatively narrow circumferential extent (sometimes called "chin" inlets). As such, there is more space available for a pitch change mechanism. Inlets to turbofan engines, however, have annular inlets, which take up more space within the engine housing than the more limited circumferential extent occupied by a turboprop inlet. Accommodating both a pitch change mechanism and annular inlet poses a unique challenge for a turbofan engine with variable pitch fan blades.

For at least these reasons, the loading on a pitch change mechanism and packaging of this system for a turbofan engine having greater number of blades than a turboprop engine presents challenges. It is not simply a matter of scaling-up the space available and size of component parts used in a turboprop engine fan actuation system. Indeed, it has been found that the problem is both unique to the engine type and complex—not amenable to a ready solution based on pre-existing variable pitch turboprop engine design. The inventors, seeking a need to find a solution to this problem, designed and tested several different turbofan engine architectures in an effort to arrive at a fan actuation system that met both the higher loading and more compact space requirements of a turbofan engine.

Referring now to the drawings, FIG. 1 is a schematic cross-sectional diagram of a turbofan engine 110, taken along a longitudinal centerline axis 112 of the turbofan engine 110, according to an embodiment of the present disclosure. As shown in FIG. 1, the turbofan engine 110 defines an axial direction A (extending parallel to the longitudinal centerline axis 112 provided for reference) and a radial direction R that is normal to the axial direction A. In general, the turbofan engine 110 includes a fan assembly 114 and a turbo-engine 116 disposed downstream from the fan assembly 114.

The turbo-engine 116 includes, in serial flow relationship, a compressor section 121, a combustion section 126, and a turbine section 127. The turbo-engine 116 depicted is substantially enclosed within a core cowl 118 that is substantially tubular and defines a core inlet 120 having an annular shape that is annular about the longitudinal centerline axis 112. As schematically shown in FIG. 1, the compressor section 121 includes a booster or a low-pressure (LP) compressor 122 followed downstream by a high-pressure (HP) compressor 124. The combustion section 126 is downstream of the compressor section 121 and includes a combustor. The turbine section 127 is downstream of the combustion section 126 and includes a high-pressure (HP) turbine 128 followed downstream by a low-pressure (LP) turbine 130, also referred to as a power turbine. The turbo-engine 116 also includes a core exhaust nozzle 132 that is downstream of the turbine section 127. The turbo-engine 116 further includes a high-pressure (HP) shaft 134, also referred to as a high-speed shaft, that drivingly connects the HP turbine 128 to the HP compressor 124. The HP turbine 128 and the HP compressor 124 rotate in unison through the HP shaft 134. The turbo-engine 116 includes a low-pressure (LP) shaft 136, also referred to as a low-speed shaft, that drivingly connects the LP turbine 130 to the LP compressor 122. The LP turbine 130 and the LP compressor 122 rotate in unison through the LP shaft 136. The compressor section 121, the combustion section 126, the turbine section 127, and the core exhaust nozzle 132 together define a core air flow path.

For the embodiment depicted in FIG. 1, the fan assembly 114 includes a fan 138 (e.g., a variable pitch fan) having a plurality of fan blades 140 coupled to a disk 142 in a spaced apart manner. As depicted in FIG. 1, the fan blades 140 extend outwardly from the disk 142 generally along the radial direction R from a fan root 141 to a fan tip 143. Each fan blade 140 is rotatable relative to the disk 142 about a pitch axis P by virtue of the fan blades 140 being operatively coupled to a fan actuation system 144 configured to collectively vary the pitch of the fan blades 140 in unison, as detailed further below. The fan actuation system 144 is disposed within a fan hub 148. The fan blades 140, the disk 142, and the fan actuation system 144 are together rotatable about the longitudinal centerline axis 112 via a fan shaft 145 that is powered by the LP shaft 136 across a power gearbox, also referred to as a gearbox assembly 146.

The gearbox assembly 146 is shown schematically in FIG. 1. The gearbox assembly 146 includes a plurality of gears for adjusting the rotational speed of the fan shaft 145 and, thus, the fan 138 relative to the LP shaft 136. The gearbox assembly 146 has a gear ratio in a range of 3.5:1 to 5:1 for a ducted engine (e.g., the turbofan engine 110). The LP shaft 136, the gearbox assembly 146, and the fan shaft 145 are disposed in an in-line configuration such that the LP shaft 136, the gearbox assembly 146, and the fan shaft 145 are coaxial and are each disposed about the longitudinal centerline axis 112. The in-line configuration helps to reduce the space needed within the turbofan engine 110 for the gearbox assembly 146 and allows a greater amount of torque to be transferred from the LP shaft 136 to the fan shaft 145 through the gearbox assembly 146 as compared to turboprop engines in which the gearbox assembly is typically disposed in a stepped configuration and is not coaxial with the LP shaft and the fan shaft.

Referring still to the exemplary embodiment of FIG. 1, the disk 142 is covered by a fan hub 148 that rotates and is aerodynamically contoured to promote an airflow through the plurality of fan blades 140. In addition, the fan assembly 114 includes an annular fan casing or a nacelle 150 that circumferentially surrounds the fan 138 and at least a portion of the turbo-engine 116. In this way, the turbofan engine 110 is a ducted engine. The nacelle 150 is supported relative to the turbo-engine 116 by a plurality of fan guide vanes 152, also referred to as outlet guide vanes, that is spaced circumferentially about the nacelle 150. Moreover, a downstream section 154 of the nacelle 150 extends over an outer portion of the turbo-engine 116 to define a bypass airflow passage 156 therebetween.

During operation of the turbofan engine 110, a volume of air 158 enters the turbofan engine 110 through an inlet 160 of the nacelle 150 or the fan assembly 114. As the volume of air 158 passes across the fan blades 140, a first portion of air, referred to as bypass air 162, is directed or routed into the bypass airflow passage 156, and a second portion of air, referred to as core air 164, is directed or is routed into the upstream section of the core air flow path, or, more specifically, into the core inlet 120 of the LP compressor 122. The ratio between the bypass air 162 and the core air 164 is commonly known as a bypass ratio. The pressure of the core air 164 is then increased by the LP compressor 122 to form compressed air 165, and the compressed air 165 is routed through the HP compressor 124 and into the combustion section 126, where the compressed air 165 is mixed with fuel and burned to generate combustion gases 166.

The combustion gases 166 are routed into the HP turbine 128 and expanded through the HP turbine 128 where a portion of thermal energy and kinetic energy from the combustion gases 166 is extracted via one or more stages of HP turbine stator vanes 168 that are coupled to the core cowl 118 and HP turbine rotor blades 170 that are coupled to the HP shaft 134. This causes the HP shaft 134 to rotate, thereby supporting operation of the HP compressor 124 (e.g., a self-sustaining cycle). In this way, the combustion gases 166 do work in the HP turbine 128 to cause the HP turbine rotor blades 170 (and the HP shaft 134) to rotate at a sufficient rate to maintain the compression ratio of the HP compressor 124 (e.g., self-sustaining cycle). The combustion gases 166 are then routed into the LP turbine 130 and expanded through the LP turbine 130. Here, a second portion of the thermal energy and the kinetic energy is extracted from the combustion gases 166 via one or more stages of LP turbine stator vanes 166 that are coupled to the core cowl 118 and LP turbine rotor blades 174 that are coupled to the LP shaft 136. This causes the LP shaft 136 to rotate, thereby supporting operation of the LP compressor 122 and rotation of the fan 138 via the gearbox assembly 146 (e.g., a self-sustaining cycle). In this way, the combustion gases 166 do work in the LP turbine 130 to cause the LP turbine blades 174 (and the LP shaft 136) to rotate.

The combustion gases 166 are subsequently routed through the core exhaust nozzle 132 of the turbo-engine 116 to provide propulsive thrust at a thrust level of the turbofan engine 110. The thrust level of the turbofan engine 110 includes a cruise thrust level defined by a cruise Mach number $M_{cruise}$ that is the Mach number of the turbofan engine 110 at cruise conditions, or mid-level power conditions. Simultaneously, the bypass air 162 is directed through the bypass airflow passage 156 before being exhausted from a fan exhaust nozzle 176 of the turbofan engine 110, also providing propulsive thrust. The HP turbine 128, the LP turbine 130, and the core exhaust nozzle 132 at least partially define a hot gas path 178 for routing the combustion gases 166 through the turbo-engine 116.

The turbofan engine 110 depicted in FIG. 1 is by way of example only. In other exemplary embodiments, the turbofan engine 110 may have other suitable configurations. In other exemplary embodiments, any other suitable number or configuration of compressors, turbines, shafts, or a combination thereof may be provided. The turbofan engine 110 may also be a direct drive engine, which does not have a power gearbox. The fan speed is the same as the LP shaft speed for a direct drive engine. In still other exemplary embodiments, aspects of the present disclosure may be incorporated into other suitable turbofan engines, such as, for example, propfan (e.g., unducted fan) engines.

Figure 2:
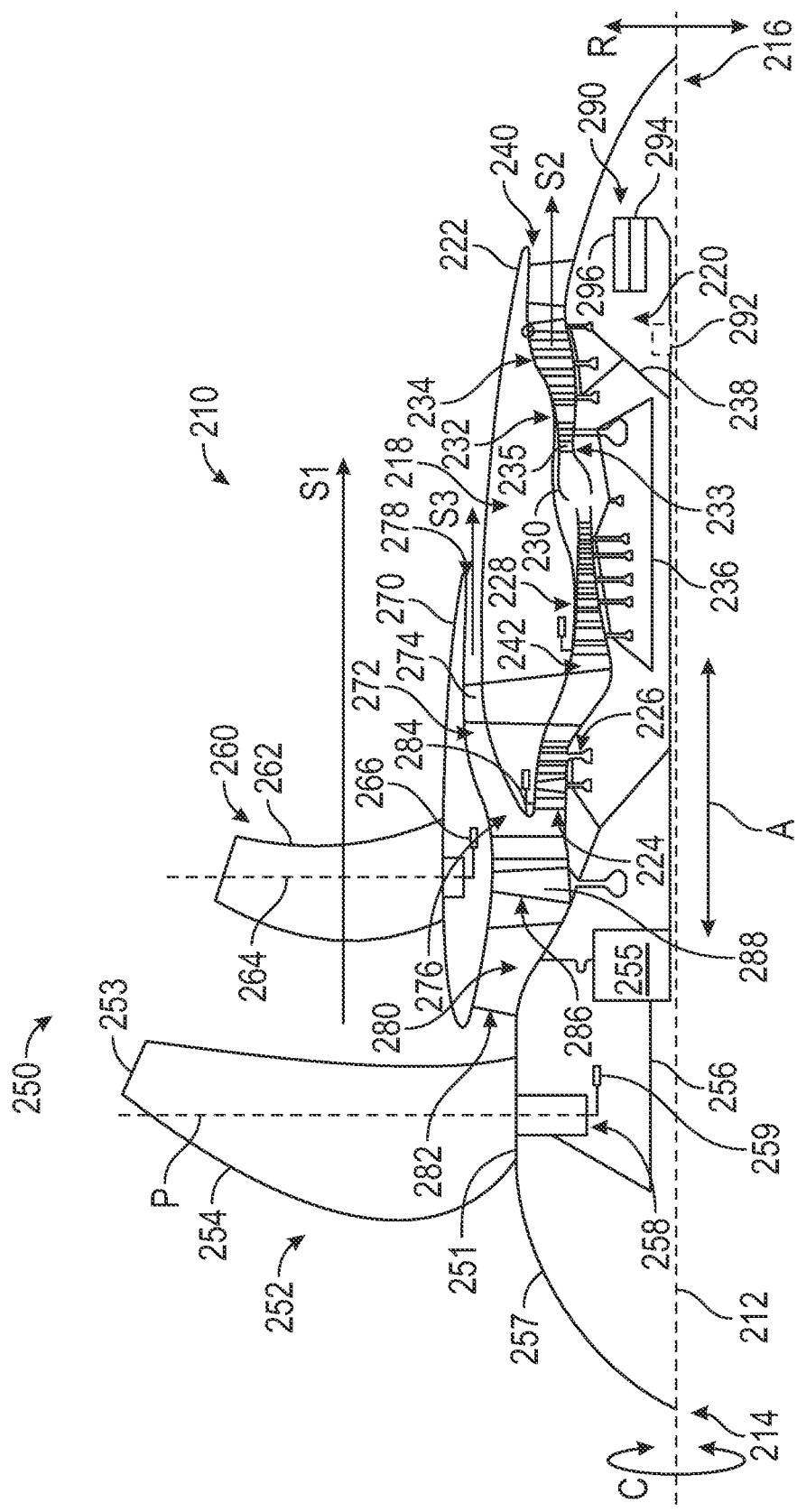
FIG. 2 shows a schematic view of an unducted, three-stream turbofan engine.

FIG. 2 shows a schematic view of an unducted, three-stream, turbofan engine 210 for an aircraft, that may incorporate one or more embodiments of the present disclosure. In this way, the turbofan engine 210 is an unducted fan engine or an open fan engine. The turbofan engine 210 is a "three-stream engine" in that its architecture provides three distinct streams (labeled S1, S2, and S3) of thrust-producing airflow during operation, as detailed further below.

As shown in FIG. 2, the turbofan engine 210 defines an axial direction A, a radial direction R, and a circumferential direction C. Moreover, the turbofan engine 210 defines a longitudinal centerline axis 212 that extends along the axial direction A. In general, the axial direction A extends parallel to the longitudinal centerline axis 212, the radial direction R extends outward from, and inward to, the longitudinal centerline axis 212 in a direction orthogonal to the axial direction A, and the circumferential direction C extends three hundred sixty degrees (360°) around the longitudinal centerline axis 212. The turbofan engine 210 extends between a forward end 214 and an aft end 216, e.g., along the axial direction A.

The turbofan engine 210 includes a turbo-engine 220 and a fan assembly 250 positioned upstream thereof. Generally, the turbo-engine 220 includes a compressor section, a combustion section, a turbine section, and an exhaust section. Particularly, as shown in FIG. 2, the turbo-engine 220 includes an engine core 218 and a core cowl 222 that annularly surrounds the turbo-engine 220. The turbo-engine 220 and the core cowl 222 define a core inlet 224 having an annular shape that is annular about the longitudinal centerline axis 212. The core cowl 222 further encloses and supports a low-pressure (LP) compressor 226 (also referred to as a booster) for pressurizing the air that enters the turbo-engine 220 through the core inlet 224. A high-pressure (HP) compressor 228 receives pressurized air from the LP compressor 226 and further increases the pressure of the air. The pressurized air flows downstream to a combustor 230 where fuel is injected into the pressurized air and ignited to raise the temperature and the energy level of the pressurized air, thereby generating combustion gases.

The combustion gases flow from the combustor 230 downstream to a high-pressure (HP) turbine 232. The HP turbine 232 drives the HP compressor 228 through a first shaft, also referred to as a high-pressure (HP) shaft 236 (also referred to as a "high-speed shaft"). In this regard, the HP turbine 232 is drivingly coupled with the HP compressor 228. Together, the HP compressor 228, the combustor 230, and the HP turbine 232 define the engine core 218. The combustion gases then flow to a power turbine or a low-pressure (LP) turbine 234. The LP turbine 234 drives the LP compressor 226 and components of the fan assembly 250 through a second shaft, also referred to as a low-pressure (LP) shaft 238 (also referred to as a "low-speed shaft"). In this regard, the LP turbine 234 is drivingly coupled with the LP compressor 226 and components of the fan assembly 250. The LP shaft 238 is coaxial with the HP shaft 236 in the embodiment of FIG. 2. After driving each of the HP turbine 232 and the LP turbine 234, the combustion gases exit the turbo-engine 220 through a core exhaust nozzle 240. The turbo-engine 220 defines a core flowpath, also referred to as a core duct 242, that extends between the core inlet 224 and the core exhaust nozzle 240. The core duct 242 is an annular duct positioned generally inward of the core cowl 222 along the radial direction R.

The fan assembly 250 includes a fan 252, also referred to as a primary fan. For the embodiment of FIG. 2, the fan 252 is an open rotor fan, also referred to as an unducted fan. However, in other embodiments, the fan 252 may be ducted, e.g., by a fan casing or a nacelle circumferentially surrounding the fan 252, similar to the embodiment of FIG. 1. The fan 252 includes a plurality of fan blades 254 (only one shown in FIG. 2) that extends in the radial direction R from a fan root 251 to a fan tip 253. The plurality of fan blades 254 is rotatable about the longitudinal centerline axis 212 via a fan shaft 256. As shown in FIG. 2, the fan shaft 256 is coupled with the LP shaft 238 via a speed reduction gearbox or a power gearbox, also referred to as a gearbox assembly 255, e.g., in an indirect-drive configuration.

The gearbox assembly 255 is shown schematically in FIG. 2. The gearbox assembly 255 includes a plurality of gears for adjusting the rotational speed of the fan shaft 256 and, thus, the fan 252 relative to the LP shaft 238 to a more efficient rotational fan speed. The gearbox assembly may have a gear ratio of 4:1 to 12:1, or 7:1 to 12:1, or 4:1 to 10:1, or 5:1 to 9:1, or 6:1 to 9:1, and may be configured in an epicyclic star or a planet gear configuration. Preferably, the gearbox assembly has a gear ratio of 4:1 to 10:1 for an unducted fan engine (e.g., the turbofan engine 210). The gearbox may be a single stage gearbox or a compound gearbox (e.g., having a plurality of stages). The LP shaft 238, the gearbox assembly 255, and the fan shaft 256 are disposed in an in-line configuration such that the LP shaft 238, the gearbox assembly 255, and the fan shaft 256 are coaxial and are each disposed about the longitudinal centerline axis 212.

The fan blades 254 can be arranged in equal spacing around the longitudinal centerline axis 212. Each fan blade 254 extends outwardly from a disk (not shown in FIG. 2) generally along the radial direction R. The disk is covered by a fan hub 257 that is rotatable and aerodynamically contoured to promote an airflow through the plurality of fan blades 254. Each fan blade 254 has a root and a tip, and a span defined therebetween. Each of the plurality of fan blades 254 defines a pitch axis P. For the embodiment of FIG. 2, each of the plurality of fan blades 254 of the fan 252 is rotatable about their respective pitch axis P, e.g., in unison with one another. A fan actuation system 258 controls one or more actuators 259 to pitch the fan blades 254 about their respective pitch axis P. The fan actuation system 258 is disposed within the fan hub 257.

The fan assembly 250 further includes a fan guide vane array 260 that includes a plurality of fan guide vanes 262 (only one shown in FIG. 2) disposed around the longitudinal centerline axis 212. For the embodiment of FIG. 2, the plurality of fan guide vanes 262 is not rotatable about the longitudinal centerline axis 212. Each of the plurality of fan guide vanes 262 has a root and a tip, and a span defined therebetween. The plurality of fan guide vanes 262 can be unshrouded as shown in FIG. 2 or can be shrouded, e.g., by an annular shroud spaced outward from the tips of the fan guide vanes 262 along the radial direction R. Each of the plurality of fan guide vanes 262 defines a vane pitch axis 264. For the embodiment of FIG. 2, each of the plurality of fan guide vanes 262 of the fan guide vane array 260 is rotatable about their respective vane pitch axis 264, e.g., in unison with one another. One or more actuators 266 are controlled to pitch the plurality of fan guide vanes 262 about their respective vane pitch axis 264. In other embodiments, each of the plurality of fan guide vanes 262 is fixed or is unable to be pitched about the vane pitch axis 264. The plurality of fan guide vanes 262 is mounted to a fan cowl 270.

The fan cowl 270 annularly encases at least a portion of the core cowl 222 and is generally positioned outward of the core cowl 222 along the radial direction R. Particularly, a downstream section of the fan cowl 270 extends over a forward portion of the core cowl 222 to define a fan flowpath, also referred to as a fan duct 272. Incoming air enters through the fan duct 272 through a fan duct inlet 276 and exits through a fan exhaust nozzle 278 to produce propulsive thrust. The fan duct 272 is an annular duct positioned generally outward of the core duct 242 along the radial direction R. The fan cowl 270 and the core cowl 222 are connected together and supported by a plurality of struts 274 (only one shown in FIG. 2) that extends substantially radially and are circumferentially spaced about the longitudinal centerline axis 212. The plurality of struts 274 is each aerodynamically contoured to direct air flowing thereby. Other struts, in addition to the plurality of struts 274, can be used to connect and to support the fan cowl 270 and the core cowl 222.

The turbofan engine 210 also defines or includes an inlet duct 280. The inlet duct 280 extends between an engine inlet 282 and the core inlet 224 and the fan duct inlet 276. The engine inlet 282 is defined generally at the forward end of the fan cowl 270 and is positioned between the fan 252 and the fan guide vane array 260 along the axial direction A. The inlet duct 280 is an annular duct that is positioned inward of the fan cowl 270 along the radial direction R. Air flowing downstream along the inlet duct 280 is split, not necessarily evenly, into the core duct 242 and the fan duct 272 by a splitter 284 of the core cowl 222. The inlet duct 280 is wider than the core duct 242 along the radial direction R. The inlet duct 280 is also wider than the fan duct 272 along the radial direction R.

The fan assembly 250 also includes a mid-fan 286. The mid-fan 286 includes a plurality of mid-fan blades 288 (only one shown in FIG. 2). The plurality of mid-fan blades 288 is rotatable, e.g., about the longitudinal centerline axis 212. The mid-fan 286 is drivingly coupled with the LP turbine 234 via the LP shaft 238. The plurality of mid-fan blades 288 can be arranged in equal circumferential spacing about the longitudinal centerline axis 212. The plurality of mid-fan blades 288 is annularly surrounded (e.g., ducted) by the fan cowl 270. In this regard, the mid-fan 286 is positioned inward of the fan cowl 270 along the radial direction R. The mid-fan 286 is positioned within the inlet duct 280 upstream of both the core duct 242 and the fan duct 272. A ratio of a span of a fan blade 254 to that of a mid-fan blade 288 (a span is measured from a root to tip of the respective blade) is greater than 2 and less than 10, to achieve the desired benefits of the third stream (S3), particularly, the additional thrust it offers to the engine, which can enable a smaller diameter fan blade 254 (benefits engine installation).

Accordingly, air flowing through the inlet duct 280 flows across the plurality of mid-fan blades 288 and is accelerated downstream thereof. At least a portion of the air accelerated by the mid-fan blades 288 flows into the fan duct 272 and is ultimately exhausted through the fan exhaust nozzle 278 to produce propulsive thrust. Also, at least a portion of the air accelerated by the plurality of mid-fan blades 288 flows into the core duct 242 and is ultimately exhausted through the core exhaust nozzle 240 to produce propulsive thrust. Generally, the mid-fan 286 is a compression device positioned downstream of the engine inlet 282. The mid-fan 286 is operable to accelerate air into the fan duct 272, also referred to as a secondary bypass passage.

During operation of the turbofan engine 210, an initial airflow or an incoming airflow passes through the fan blades 254 of the fan 252 and splits into a first airflow and a second airflow. The first airflow bypasses the engine inlet 282 and flows generally along the axial direction A outward of the fan cowl 270 along the radial direction R. The first airflow accelerated by the fan blades 254 passes through the fan guide vanes 262 and continues downstream thereafter to produce a primary propulsion stream or a first thrust stream S1. A majority of the net thrust produced by the turbofan engine 210 is produced by the first thrust stream S1. The second airflow enters the inlet duct 280 through the engine inlet 282.

The second airflow flowing downstream through the inlet duct 280 flows through the plurality of mid-fan blades 288 of the mid-fan 286 and is consequently compressed. The second airflow flowing downstream of the mid-fan blades 288 is split by the splitter 284 located at the forward end of the core cowl 222. Particularly, a portion of the second airflow flowing downstream of the mid-fan 286 flows into the core duct 242 through the core inlet 224. The portion of the second airflow that flows into the core duct 242 is progressively compressed by the LP compressor 226 and the HP compressor 228, and is ultimately discharged into the combustion section. The discharged pressurized air stream flows downstream to the combustor 230 where fuel is introduced to generate combustion gases or products.

The combustor 230 defines an annular combustion chamber that is generally coaxial with the longitudinal centerline axis 212. The combustor 230 receives pressurized air from the HP compressor 228 via a pressure compressor discharge outlet. A portion of the pressurized air flows into a mixer.

Fuel is injected by a fuel nozzle (omitted for clarity) to mix with the pressurized air thereby forming a fuel-air mixture that is provided to the combustion chamber for combustion. Ignition of the fuel-air mixture is accomplished by one or more igniters (omitted for clarity), and the resulting combustion gases flow along the axial direction A toward, and into, a first stage turbine nozzle 233 of the HP turbine 232. The first stage turbine nozzle 233 is defined by an annular flow channel that includes a plurality of radially extending, circumferentially spaced nozzle vanes 235 that turn the combustion gases so that the combustion gases flow angularly and impinge upon first stage turbine blades of the HP turbine 232. The combustion gases exit the HP turbine 232 and flow through the LP turbine 234, and exit the core duct 242 through the core exhaust nozzle 240 to produce a core air stream, also referred to as a second thrust stream S2. As noted above, the HP turbine 232 drives the HP compressor 228 via the HP shaft 236, and the LP turbine 234 drives the LP compressor 226, the fan 252, and the mid-fan 286 via the LP shaft 238.

The other portion of the second airflow flowing downstream of the mid-fan 286 is split by the splitter 284 into the fan duct 272. The air enters the fan duct 272 through the fan duct inlet 276. The air flows generally along the axial direction A through the fan duct 272 and is ultimately exhausted from the fan duct 272 through the fan exhaust nozzle 278 to produce a third stream, also referred to as a third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore, in certain embodiments, aspects of the third stream (e.g., airstream properties, mixing properties, or exhaust properties), and thereby a percent contribution to total thrust, are passively adjusted during engine operation or can be modified purposefully through the use of engine control features (such as fuel flow, electric machine power, variable stators, variable inlet guide vanes, valves, variable exhaust geometry, or fluidic features) to adjust or to improve overall system performance across a broad range of potential operating conditions.

The turbofan engine 210 depicted in FIG. 2 is by way of example only. In other embodiments, the turbofan engine 210 may have other suitable configurations. For example, the fan 252 can be ducted by a fan casing or a nacelle such that a bypass passage is defined between the fan casing and the fan cowl 270. Moreover, in other embodiments, any other suitable number or configuration of compressors, turbines, shafts, or a combination thereof may be provided. In still other embodiments, aspects of the present disclosure may be incorporated into any other suitable turbofan engine, such as, for example, turbofan engines defining two streams (e.g., a bypass stream and a core air stream).

Further, for the depicted embodiment of FIG. 2, the turbofan engine 210 includes an electric machine 290 (e.g., a motor-generator) operably coupled with a rotating component thereof. In this regard, the turbofan engine 210 is a hybrid-electric propulsion machine. Particularly, as shown in FIG. 2, the electric machine 290 is operatively coupled with the LP shaft 238. The electric machine 290 can be mechanically connected to the LP shaft 238, either directly, or indirectly, e.g., by way of a gearbox assembly 292 (shown schematically in FIG. 2). Further, although, in this embodiment the electric machine 290 is operatively coupled with the LP shaft 238 at an aft end of the LP shaft 238, the electric machine 290 can be coupled with the LP shaft 238 at any suitable location or can be coupled to other rotating components of the turbofan engine 210, such as the HP shaft 236 or the LP shaft 238. For instance, in some embodiments, the electric machine 290 can be coupled with the LP shaft 238 and positioned forward of the mid-fan 286 along the axial direction A. In some embodiments, the turbofan engine of FIG. 1 also includes an electric machine coupled to the LP shaft and located in the tail cone of the engine.

In some embodiments, the electric machine 290 can be an electric motor operable to drive or to motor the LP shaft 238. In other embodiments, the electric machine 290 can be an electric generator operable to convert mechanical energy into electrical energy. In this way, electrical power generated by the electric machine 290 can be directed to various engine systems or aircraft systems. In some embodiments, the electric machine 290 can be a motor/generator with dual functionality. The electric machine 290 includes a rotor 294 and a stator 296. The rotor 294 is coupled to the LP shaft 238 and rotates with rotation of the LP shaft 238. In this way, the rotor 294 rotates with respect to the stator 296, thereby generating electrical power. Although the electric machine 290 has been described and illustrated in FIG. 2 as having a particular configuration, the present disclosure may apply to electric machines having alternative configurations. For instance, the rotor 294 or the stator 296 may have different configurations or may be arranged in a different manner than illustrated in FIG. 2.

Figure 3:
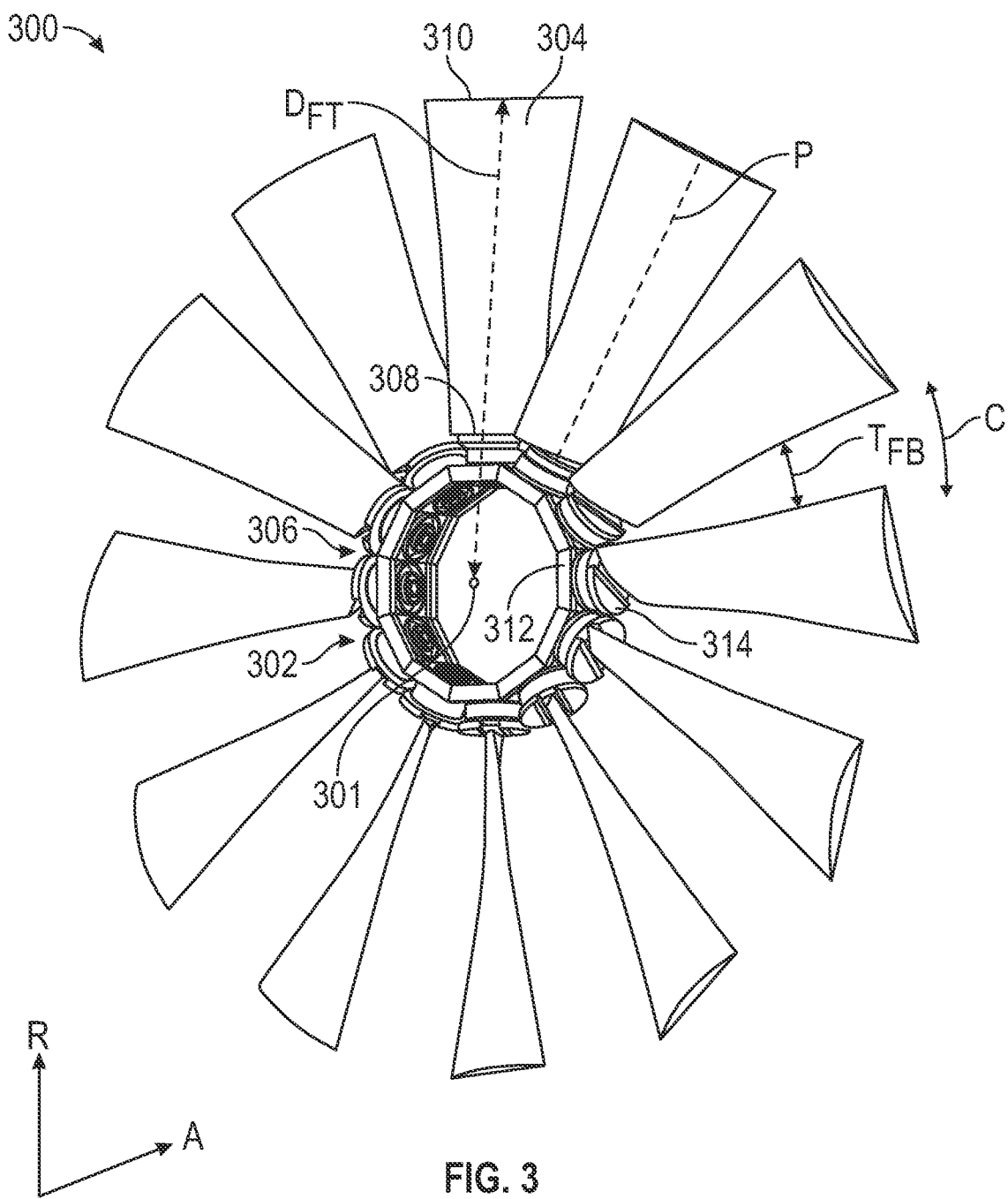
FIG. 3 shows a fan having a fan actuation system, according to the present disclosure.

FIG. 3 shows a fan 300 having a fan actuation system 302, according to the present disclosure. The fan 300 can be utilized as the fan 138 of FIG. 1 or as the fan 252 of FIG. 2. The fan 300 includes a plurality of fan blades 304 that is coupled to a disk 306 and is spaced circumferentially about a longitudinal centerline axis 301 of the fan 300. The fan 300 includes a number of fan blades, and, in particular, includes ten to eighteen fan blades 304. In the embodiment of FIG. 3, the fan 300 includes twelve fan blades 304. Each fan blade 304 extends in the radial direction R along a span of the fan blade 304 and from a fan root 308 to a fan tip 310. Each fan blade 304 has a fan tip diameter $D_{FT}$ that extends from the longitudinal centerline axis 301 to the fan tip 310 of each fan blade 304. While the fan tip diameter $D_{FT}$ is detailed with respect to the plurality of fan blades 304, the fan tip diameter $D_{FT}$ is a measurement of any of the fan blades detailed herein. The fan tip diameter $D_{FT}$ is in a range of seven feet to fourteen feet (7 ft. to 14 ft.), as detailed further below. A tangential fan blade distance $T_{FB}$ is defined in the circumferential direction C as a circumferential distance or a tangential distance between adjacent fan blades 304. As used herein, adjacent means two fan blades with no intervening fan blade therebetween.

The disk 306 includes a plurality of disk segments 312 that is rigidly coupled together or integrally molded together in a generally annular shape. One fan blade 304 is coupled to each disk segment 312 at a trunnion mechanism 314 of the fan actuation system 302. The trunnion mechanism 314 facilitates retaining the respective fan blade 304 on the disk 306 during rotation of the disk 306, while still rendering the respective fan blade 304 rotatable relative to the disk 306 about a pitch axis P of the fan blade 304. For example, the trunnion mechanism 314 provides a load path to the disk 306 for the centrifugal load generated by the fan blade 304 during rotation of the fan blade 304 about the longitudinal centerline axis 301. The trunnion mechanism 314 includes a plurality of bearings disposed within the disk segment 312 that allows the fan blade 304 to rotate about the pitch axis P.

Figure 4:
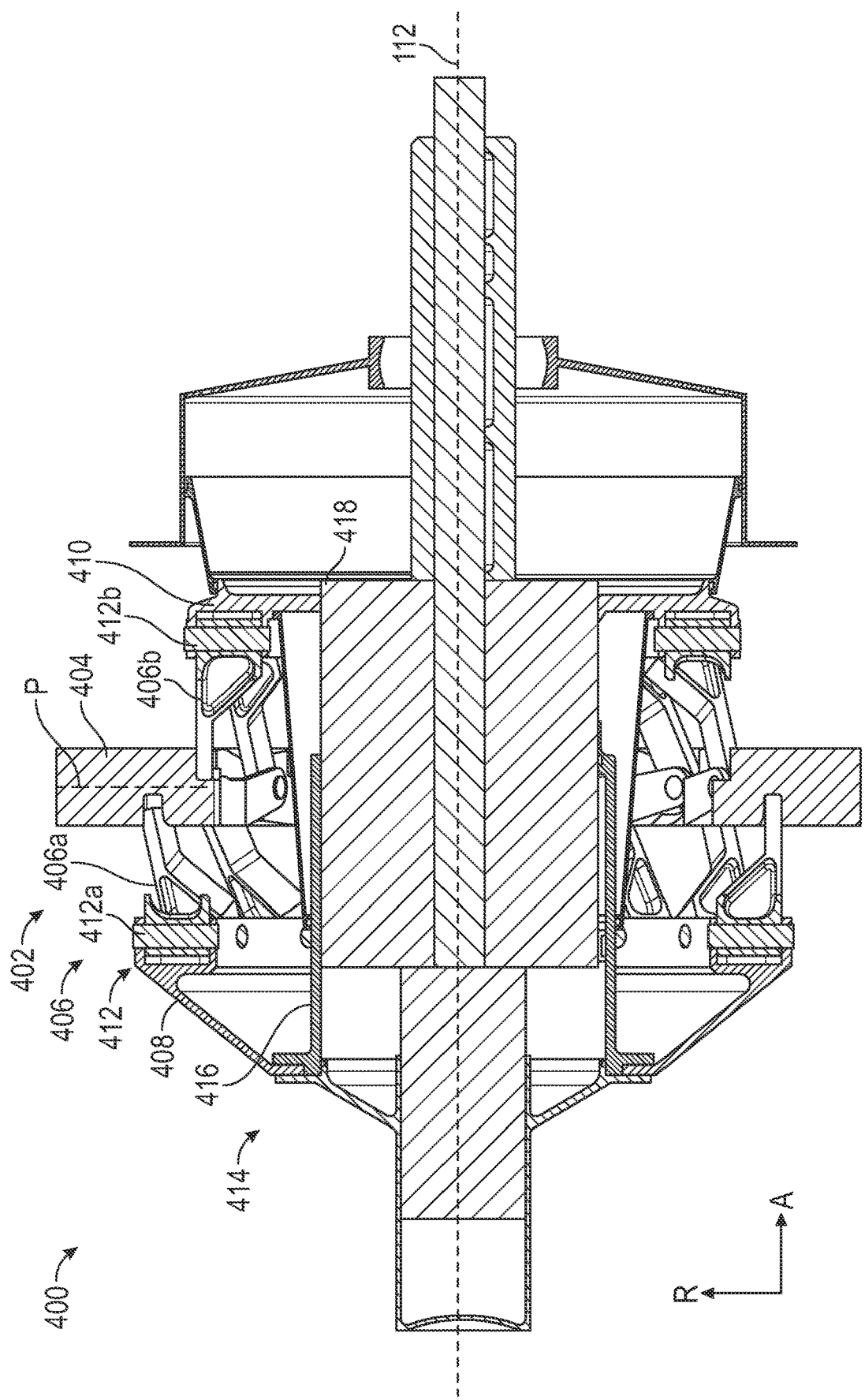
FIG. 4 is a schematic cross-sectional diagram of a fan actuation system for a turbofan engine, taken along a longitudinal centerline axis of the turbofan engine, according to the present disclosure.

FIG. 4 is a schematic cross-sectional diagram of a fan actuation system 400 for a turbofan engine, taken along a longitudinal centerline axis 112 of the turbofan engine, according to the present disclosure. The fan actuation system 400 can be utilized for any of the fans detailed herein. The fan actuation system 400 includes a trunnion mechanism 402 and one or more actuators 414. The trunnion mechanism 402 includes a plurality of trunnions 404. Each fan blade of the fan is coupled to a respective trunnion 404. Each of the plurality of trunnions 404 is rotatable about a pitch axis P to pitch the fan blades of the fan. The trunnion mechanism 402 includes a plurality of trunnion links 406 that is coupled to the plurality of trunnions 404. For example, a respective trunnion link 406 is coupled to a respective trunnion 404. The plurality of trunnion links 406 includes a plurality of forward trunnion links 406a and a plurality of aft trunnion links 406b that are coupled to the plurality of trunnions 404. The plurality of forward trunnion links 406a is pivotably coupled to the plurality of trunnions 404.

The trunnion mechanism 402 includes a plurality of unison rings 408, 410 including a forward unison ring 408 positioned forward of the plurality of trunnions 404 and an aft unison ring 410 positioned aft of the plurality of trunnions 404. The forward unison ring 408 and the aft unison ring 410 couple the plurality of trunnions 404 together. The plurality of trunnion links 406 is coupled to the forward unison ring 408 or the aft unison ring 410 via a plurality of pins 412. The plurality of forward trunnion links 406a is pivotably coupled to the forward unison ring 408 by a plurality of forward pins 412a such that the plurality of trunnions 404 is coupled to the forward unison ring 408. For example, each forward trunnion link 406a extends forward from a respective trunnion 404 to the forward unison ring 408 and a respective forward pin 412a is disposed through the forward trunnion link 406a at the forward unison ring 408 to pivotably couple the forward trunnion link 406a to the forward unison ring 408. Each aft trunnion link 406b extends aftward from the respective trunnion 404 to the aft unison ring 410 and a respective aft pin 412b is disposed through the aft trunnion link 406b at the aft unison ring 410 to pivotably couple the aft trunnion link 406b to the aft unison ring 410. In this way, each of the plurality of trunnions 404 is pivotably coupled to the forward unison ring 408 and to the aft unison ring 410 such that the plurality of trunnions 404 can pivot about the pitch axis P in unison.

The one or more actuators 414 include a hydraulic cylinder 416 and a piston 418 disposed within the hydraulic cylinder 416. The hydraulic cylinder 416 and the piston 418 are movable along the axial direction A. In this way, the one or more actuators 414 are hydraulic linear actuators such that the hydraulic cylinder 416 and the piston 418 move linearly along the axial direction A (e.g., in opposite directions along the longitudinal centerline axis 112). The forward unison ring 408 is coupled to the hydraulic cylinder 416 such that the forward unison ring 408 moves when the hydraulic cylinder 416 moves. The aft unison ring 410 is coupled to the piston 418 such that aft unison ring 410 moves when the piston 418 moves.

In operation, the fan actuation system 400 moves the plurality of fan blades 140 (FIG. 1) between a first end position and a second end position. The first end position, referred to herein as a feather position, corresponds to a position in which the plurality of fan blades 140 produces the least (e.g., minimal) amount of resistance or drag. In some examples, this position corresponds to a position in which the plurality of fan blades 140 is aligned or substantially aligned (e.g., ±5°) with the flow of the volume of air (e.g., the volume of air 158 of FIG. 1). The second end position is a reverse position in which the plurality of fan blades 140 exceeds, for example, a plane that is transverse to the longitudinal centerline axis 112 (the direction of forward movement of the aircraft) by a certain degree (e.g., 30°) so as to assist with the braking of the aircraft. Therefore, in some examples, the angular stroke of the plurality of fan blades 140 between the feather position and the reverse position is, for example, approximately 120°. The plurality of fan blades 140 can be moved to any position or any angle between the feather position and the reverse position depending on the phase of flight to improve (e.g., optimize) efficiency of the turbofan engine 110 (FIG. 1). In some examples, one or more stops or limits are provided to prevent the plurality of fan blades 140 from being rotated beyond the two end positions. In other examples, the fan actuation system 400 can be configured to provide a greater stroke or a lesser stroke and/or the end positions may be different.

A hydraulic system supplies a hydraulic fluid (e.g., oil) to one or more hydraulic chambers of the one or more actuators 414 to move the hydraulic cylinder 416 and the piston 418 to pitch the plurality of fan blades 140. An exemplary hydraulic system and hydraulic chambers are detailed below with respect to FIG. 5. The plurality of trunnions 404 is disposed in FIG. 4 such that the plurality of fan blades 140 is in the first end position (e.g., the feather position). The pressure of the hydraulic fluid in the one or more hydraulic chambers can be increased to move the hydraulic cylinder 416 in a first direction and to move the piston 418 in a second direction such that the plurality of trunnions 404 move the plurality of fan blades 140 from the feather position towards the reverse position (e.g., the second end position). For example, the hydraulic cylinder 416 can move axially aftward (e.g., to the right in FIG. 4) and the piston 418 can move axially forward (e.g., to the left in FIG. 4) when the pressure of the hydraulic fluid is increased. To move the plurality of fan blades 140 from the reverse position to the feather position, the pressure of the hydraulic fluid in the one or more hydraulic chambers can be decreased to move the hydraulic cylinder 416 in the second direction (e.g., axially forward) and to move the piston 418 in the first direction (e.g., axially aftward).

As the hydraulic cylinder 416 moves axially along the axial direction A, the hydraulic cylinder 416 causes the forward unison ring 408 to move, thereby causing the plurality of forward trunnion links 406a to pivot and to pitch the plurality of trunnions 404, and, therefore, pitching the plurality of fan blades 140 about the pitch axis P. At the same time, movement of the piston 418 along the axial direction A causes the aft unison ring 410 to move, thereby, causing the plurality of aft trunnion links 406b to pivot in an opposite direction as the forward trunnion links 406a, and, therefore, pitching the plurality of fan blades 140 about the pitch axis P. In this way, the fan actuation system 400 translates linear motion of the one or more actuators 414 (e.g., along the axial direction A) into rotational motion of the plurality of fan blades 140. Such a configuration enables a compact and lightweight design of the fan actuation system 400. Further, each of the hydraulic cylinder 416 and the piston 418 provides only half of the force needed to actuate the plurality of trunnions 404 and provides a redundant path in the event that one of the hydraulic cylinder 416 or the piston 418 fails.

Figure 5:
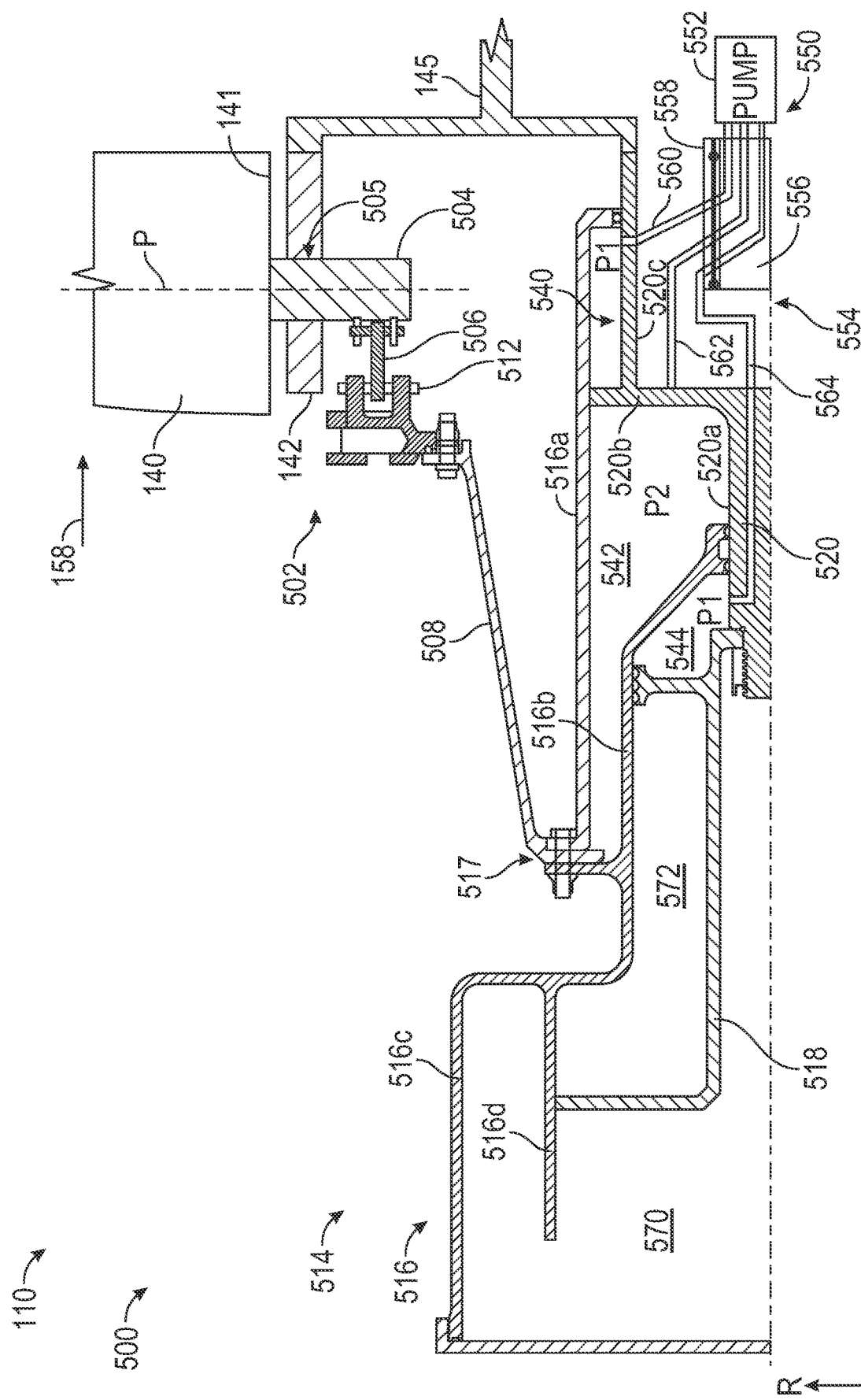
FIG. 5 is a schematic cross-sectional view of a fan actuation system for a turbofan engine, according to another embodiment.

FIG. 5 is a schematic cross-sectional view of a fan actuation system 500 for a turbofan engine, according to another embodiment. The fan actuation system 500 is shown as being utilized in the turbofan engine 110, but can be utilized in the turbofan engine 210. Only the top half of the fan actuation system 500 is shown in FIG. 5. However, the fan actuation system 500 is symmetrical about the longitudinal centerline axis 112. The fan actuation system 500 may also be referred to as a fan pitch actuation system (FPAS). The fan actuation system 500 controls the pitch (e.g., angle, orientation) of the plurality of fan blades 140 about the pitch axis P. In some examples, the fan actuation system 500 can move the fan blades 140 between a first end position and a second end position.

FIG. 5 shows the fan shaft 145 of the turbofan engine 110 (FIG. 1). The fan shaft 145 is coupled to, and driven by, the LP shaft 136 (FIG. 1). As shown in FIG. 5, the disk 142 is coupled to (e.g., directly or indirectly), and driven by, the fan shaft 145. Each of the plurality of fan blades 140 is coupled to, and extends radially outward from, the disk 142. Therefore, as the fan shaft 145 is rotated (via the LP shaft 136), the fan shaft 145 rotates the disk 142, which rotates the plurality of fan blades 140 to generate thrust.

The fan actuation system 500 includes a trunnion mechanism 502 including a plurality of trunnions 504. Each fan blade 140 is coupled to a respective one of the plurality of trunnions 504. The plurality of trunnions 504 extends through an opening 505 in the disk 142. The plurality of trunnions 504 is rotatable in the opening 505. This enables the plurality of fan blades 140 to rotate about the pitch axis P. As such, the pitch of the plurality of fan blades 140 can be changed relative to the flow of the volume of air 158. In particular, the plurality of fan blades 140 can be rotated (e.g., pitched) to any position between the first end position (e.g., the feather position) and the second end position (e.g., the reverse position). In FIG. 5, the plurality of fan blades 140 is shown in the feather position. In the feather position, the plurality of fan blades 140 is substantially aligned with the flow of the volume of air 158, which reduces resistance or drag. The plurality of fan blades 140 is typically held in the feather position when the turbofan engine 110 (FIG. 1) is not operating.

The fan actuation system 500 includes a plurality of trunnion links 506 and a unison ring 508. The plurality of trunnion links 506 is pivotably coupled to the plurality of trunnions 504. For example, each trunnion link 506 is coupled to a respective trunnion 504 and to the unison ring 508. In this way, the unison ring 508 couples the plurality of trunnions 504 together. The plurality of trunnion links 506 is coupled to the unison ring 508 via a plurality of pins 512. In this way, the plurality of trunnions 504 is pivotably coupled to the unison ring 508 such that the plurality of trunnions 504, and, thus, the plurality of fan blades 140, can pivot about the pitch axis P in unison, as detailed further below.

The fan actuation system 500 includes one or more actuators 514 that include a hydraulic cylinder 516, a piston 518, and a piston retainer 520. The piston retainer 520 is coupled (e.g., bolted) to the fan shaft 145 such that the piston retainer 520 rotates with the fan shaft 145. Therefore, the piston retainer 520 is coupled (e.g., indirectly) to, and rotated by, the LP shaft 136 (FIG. 1). Also, the piston 518 is coupled to, and extends in a forward direction, from the piston retainer 520. Therefore, the piston 518 also rotates with the piston retainer 520 and the fan shaft 145. The hydraulic cylinder 516 also rotate with the piston retainer 520 and the piston 518, but is axially slidable relative to the piston retainer 520 and the piston 518, as disclosed in further detail herein. In some examples, the hydraulic cylinder 516 is disposed within the fan hub 148 (FIG. 1) of the turbofan engine 110 (FIG. 1).

In the illustrated example of FIG. 5, the piston retainer 520 has a first portion 520a (e.g., a post), a second portion 520b (e.g., a flange) that extends radially outward from the first portion 520a, and a third portion 520c (e.g., a shaft) that extends axially from the second portion 520b. The third portion 520c is coupled (e.g., bolted) to the fan shaft 145. The piston retainer 520 can be constructed as multiple parts coupled (e.g., welded) together or as a single unitary part or component (e.g., a monolithic structure). The piston 518 is coupled to, and extends forward from, the first portion 520a of the piston retainer 520.

The hydraulic cylinder 516 is disposed radially outward of (e.g., around, surrounding) the piston retainer 520 and the piston 518. The hydraulic cylinder 516 is keyed to the piston retainer 520. As such, the piston retainer 520 rotates the hydraulic cylinder 516. However, the hydraulic cylinder 516 is slidable along the piston retainer 520 in the axial direction A (left and right in FIG. 5). This movement is used to change the pitch of the plurality of fan blades 140. The hydraulic cylinder 516 is coupled to the unison ring 508 at a joint 517 such that the hydraulic cylinder 516 is coupled to the plurality of fan blades 140 via the trunnion mechanism 502. The fan actuation system 500 can be activated to move the hydraulic cylinder 516 axially (left or right in FIG. 5), which causes the plurality of trunnion links 506 to rotate the plurality of trunnions 504, which rotates the plurality of fan blades 140 about the pitch axis P. As such, movement of the hydraulic cylinder 516 causes all of the fan blades 140 to rotate (e.g., pitch) simultaneously. When the hydraulic cylinder 516 is moved in a first axial direction (the forward direction, or to the left in FIG. 5), the plurality of fan blades 140 is rotated to the feather position, and when the hydraulic cylinder 516 is moved in a second axial direction (the rearward direction, or to the right in FIG. 5), the plurality of fan blades 140 is rotated away from the feather position and toward the reverse position. However, in other examples, the fan actuation system 500 can be configured so that the movement of the hydraulic cylinder 516 is reversed.

The hydraulic cylinder 516 has a first portion 516a, a second portion 516b, a third portion 516c, and a fourth portion 516d. The first portion 516a extends generally in the axial direction A and is coupled to the unison ring 508 at the joint 517 (e.g., a bolted joint). The second portion 516b is disposed radially inward of the first portion 516a and is coupled to the first portion 516a and to the unison ring 508 at the joint 517. The third portion 516c extends forward from the joint 517 (e.g., from the first portion 516a, the second portion 516b, and the unison ring 508) and forms a pressurized pneumatic chamber 570, disclosed in further detail herein. The fourth portion 516d is coupled to, and extends axially within, the third portion 516c. The first portion 516a, the second portion 516b, the third portion 516c, and the fourth portion 516d form the hydraulic cylinder 516. In some examples, the first portion 516a, the second portion 516b, the third portion 516c, and the fourth portion 516d are separate parts or components that are coupled (e.g., welded, bolted) together. In other examples, one or more of the first portion 516a, the second portion 516b, the third portion 516c, and the fourth portion 516d can be constructed as a single unitary part or component (e.g., a monolithic structure). In some embodiments, the hydraulic cylinder 516 and the unison ring 508 form a single unitary part or component.

The first portion 516a of the hydraulic cylinder 516 is sealingly engaged with (e.g., engaged with a seal to prevent fluid leakage) the third portion 520c of the piston retainer 520. The second portion 520b of the piston retainer 520 is sealingly engaged with the first portion 516a of the hydraulic cylinder 516. The second portion 516b of the hydraulic cylinder 516 is sealingly engaged with the first portion 520a of the piston retainer 520. The piston 518 is sealingly engaged with the second portion 516b and with the fourth portion 516d of the hydraulic cylinder 516.

The fan actuation system 500 includes one or more hydraulic chambers defined between the hydraulic cylinder 516, the piston 518, and the piston retainer 520. These hydraulic chamber(s) are used to control the position of the hydraulic cylinder 516, and, thus, to control the pitch of the plurality of fan blades 140. As shown in FIG. 5, the fan actuation system 500 includes a first hydraulic chamber 540, a second hydraulic chamber 542, and a third hydraulic chamber 544. The first hydraulic chamber 540 is formed or is defined between the first portion 516a of the hydraulic cylinder 516, the second portion 520b of the piston retainer 520, and the third portion 520c of the piston retainer 520. The second hydraulic chamber 542 is formed or is defined between the first portion 516a of the hydraulic cylinder 516, the second portion 516b of the hydraulic cylinder 516, the first portion 520a of the piston retainer 520, and the second portion 520b of the piston retainer 520. The third hydraulic chamber 544 is formed or is defined between second portion 516b of the hydraulic cylinder 516, an aft end of the piston 518, and the first portion 520a of the piston retainer 520. In this example, the first hydraulic chamber 540 and third hydraulic chamber 544 are provided with hydraulic fluid at a first pressure, referred to herein as P1, and the second hydraulic chamber 542 is provided with hydraulic fluid at a second pressure, referred to herein as P2. The first pressure P1 and the second pressure P2 can be any amount depending on the specific design. In some examples, the first pressure P1 and the second pressure P2 can be as high as one thousand pounds per square inch (1000 psi) or even higher. The first pressure P1 and the second pressure P2 can be increased or can be decreased to cause the hydraulic cylinder 516 to move axially forward or axially rearward, thus changing the pitch of the plurality of fan blades 140. For example, if the force acting on the hydraulic cylinder 516 from the first pressure P1 in the first hydraulic chamber 540 and the third hydraulic chamber 544 is greater than the force acting on the hydraulic cylinder 516 from the second pressure P2 in the second hydraulic chamber 542, the hydraulic cylinder 516 moves (e.g., slides) rearward (axially aftward, or to the right in FIG. 5) along the piston 518 and the piston retainer 520. Conversely, if the force acting on the hydraulic cylinder 516 from the first pressure P1 in the first hydraulic chamber 540 and the third hydraulic chamber 544 is less than the force acting on the hydraulic cylinder 516 from the second pressure P2 in the second hydraulic chamber 542, the hydraulic cylinder 516 moves (e.g., slides) axially forward (to the left in FIG. 5) along the piston 518 and the piston retainer 520. Therefore, the first hydraulic chamber 540 and the third hydraulic chamber 544 receive hydraulic fluid to move the hydraulic cylinder 516 in the rearward direction (e.g., aftward direction) while the second hydraulic chamber 542 receives hydraulic fluid to move the hydraulic cylinder 516 in the forward direction.

The fan actuation system 500 includes a hydraulic system 550 to provide hydraulic fluid, such as oil, to one or more of the hydraulic chambers 540, 542, 544 to control the movement of the hydraulic cylinder 516. The hydraulic system 550 includes a pump 552 to control the first pressure P1 and the second pressure P2. The pump 552 is activated to move the hydraulic fluid into, or out of, the hydraulic chambers 540, 542, 544 to increase or to decrease the first pressure P1 and the second pressure P2, and, therefore, to cause the hydraulic cylinder 516 to move forward or to move rearward. In the illustrated example, the hydraulic system 550 includes an oil transfer bearing 554. The oil transfer bearing 554 includes a fixed portion 556 (e.g., a shaft) with fluid passageways fluidly coupled to the pump 552. The fixed portion 556 is a static component and does not rotate or move axially. The oil transfer bearing 554 includes a sleeve 558 that is rotatable about the fixed portion 556. The hydraulic system 550 includes a first fluid line 560, a second fluid line 562, and a third fluid line 564 fluidly coupled between the oil transfer bearing 554 and the respective hydraulic chambers 540, 542, and 544. The first fluid line 560 is in fluid communication with the first hydraulic chamber 540, the second fluid line 562 is in fluid communication with the second hydraulic chamber 542, and the third fluid line 564 is in fluid communication with the third hydraulic chamber 544. The first fluid line 560, the second fluid line 562, and the third fluid line 564 are coupled to the sleeve 558. The sleeve 558 enables fluid communication among the first fluid line 560, the second fluid line 562, and the third fluid line 564, which are rotating with the fan actuation system 500, and the fixed portion 556 of the oil transfer bearing 554. Thus, the oil transfer bearing 554 enables the hydraulic fluid to be transferred between a stationary component and a rotating component. As disclosed above, the first hydraulic chamber 540 and the third hydraulic chamber 544 are provided with the hydraulic fluid at the same first pressure P1. The oil transfer bearing 554 fluidly couples the hydraulic fluid in the first fluid line 560 and the third fluid lines 564 such that the first hydraulic chamber 540 and the third hydraulic chamber 544 remain at the same first pressure P1.

To move the plurality of fan blades 140 away from the feather position and toward the reverse position, the pump 552 is activated to increase the first pressure P1 in the first hydraulic chamber 540 and the third hydraulic chamber 544 and to reduce the second pressure P2 in the second hydraulic chamber 542. As a result, the hydraulic cylinder 516 moves in the rearward direction (to the right in FIG. 5). The hydraulic cylinder 516 pushes the plurality of trunnion links 506 rearward (to the right in FIG. 5), which causes the plurality of fan blades 140 to rotate away from the feather position and toward the reverse position. In this way, the plurality of fan blades 140 can be moved between the feather position and the reverse position. When the desired position is reached, the pump 552 is deactivated or can otherwise balance the loads on the hydraulic cylinder 516 to maintain the current position. The pump 552 can further increase the first pressure P1 or decrease the second pressure P2 to further move the plurality of fan blades 140 toward the reverse position. Otherwise, to move the plurality of fan blades 140 back to the feather position, the pump 552 is activated to reduce the first pressure P1 in the first hydraulic chamber 540 and the third hydraulic chamber 544 or to increase the second pressure P2 in the second hydraulic chamber 542. Thus, the hydraulic system 550 is used to control the position of the hydraulic cylinder 516 for controlling the pitch of the plurality of fan blades 140 along the pitch axis P. The first pressure P1 being the same in the first hydraulic chamber 540 and the third hydraulic chambers 544 reduces the overall first pressure P1 required to control the hydraulic cylinder 516. In other examples, however, the first hydraulic chamber 540 and the third hydraulic chamber 544 can be pressurized at different pressures.

The pressurized pneumatic chamber 570 is formed or is defined by the third portion 516c of the hydraulic cylinder 516 and the piston 518. The pressurized pneumatic chamber 570 is filled with a pressurized gas. In some examples, the pressurized pneumatic chamber 570 contains pressurized nitrogen. In other examples, the pressurized pneumatic chamber 570 can be filled with another pressurized gas (e.g., air). The pressurized pneumatic chamber 570 is sealed. A such, the volume of the pressurized gas (e.g., nitrogen) in the pressurized pneumatic chamber 570 does not change. During manufacture or assembly of the fan actuation system 500, the pressurized pneumatic chamber 570 can be charged with gas (e.g., nitrogen) and then sealed. The pressurized pneumatic chamber 570 can be pressurized to any amount depending on the size of the pressurized pneumatic chamber 570 and on the size of the hydraulic chambers 540, 542, 544 and the desired biasing force. In some examples, the pressure in the pressurized pneumatic chamber 570 is in a range of seven hundred twenty pounds per square inch to nine hundred twenty pounds per square inch (720 psi to 920 psi). In other examples, however, the pressure may be less than, or greater than, these exemplary values.

The pressurized gas in the pressurized pneumatic chamber 570 generates a constant force or a constant load that biases the hydraulic cylinder 516 in the forward direction (to the left in FIG. 5), which corresponds to the feather position of the plurality of fan blades 140. This provides a failsafe to move the plurality of fan blades 140 to the feather position in an event of failure of the hydraulic system 550 or a shutdown of the turbofan engine 110. For example, if the hydraulic system 550 or the turbofan engine 110 fails or is shut down, the hydraulic system 550 is not able to provide pressurized hydraulic fluid to the hydraulic chambers 540, 542, and 544 to control or to maintain the position of the hydraulic cylinder 516. In such an instance, the force on the hydraulic cylinder 516 from the pressurized gas in the pressurized pneumatic chamber 570 overcomes the force on the hydraulic cylinder 516 from the first hydraulic chamber 540 and the third hydraulic chamber 544. As such, the hydraulic cylinder 516 moves in the forward direction (to the left in FIG. 5), which moves the plurality of fan blades 140 to the feather position shown in FIG. 5. As such, the pressurized pneumatic chamber 570 provides a passive system that moves the plurality of fan blades 140 to the feather position in the event of a failure or a deactivation of the hydraulic system 550, which may occur if the turbofan engine 110 fails or is shut down. Therefore, if one of the turbofan engines of an aircraft fails or is deactivated during flight, the fan actuation system 500 automatically moves the plurality of fan blades 140 to the feather position (FIG. 5). This is advantageous because, in the feather position, the plurality of fan blades 140 produces less resistance, which reduces drag on the turbofan engine 110 and on the aircraft. This also reduces or prevents the plurality of fan blades 140 from spinning (due to incoming airflow) the internal turbomachinery parts of the turbofan engine 110.

The example pressurized pneumatic chamber 570 is advantageous because it has a high load capability due to the compressibility of the pneumatic gas (e.g., nitrogen). Further, the pressurized pneumatic chamber 570 enables a longer travel of the hydraulic cylinder 516 with relatively little change in load. Therefore, the pressurized pneumatic chamber 570 provides a relatively constant load throughout the stroke. Also, the volume and areas of the pressurized pneumatic chamber 570 and the piston 518 can be varied to optimize the load versus travel of the hydraulic cylinder 516.

Therefore, during normal operation of the fan actuation system 500, the first hydraulic chamber 540 and the third hydraulic chamber 544 act to bias the hydraulic cylinder 516 in the rearward direction, while the second hydraulic chamber 542 and the pressurized pneumatic chamber 570 act to bias the hydraulic cylinder 516 in the forward direction. The pressures in the hydraulic chambers 540, 542, and 544 and in the pressurized pneumatic chamber 570 can be controlled to substantially balance the forces and to maintain the hydraulic cylinder 516 in a desired position. In the illustrated example of FIG. 5, a chamber 572 is formed or is defined between the hydraulic cylinder 516 and the piston 518. The chamber 572 is vented to the atmosphere. As such, the chamber 572 does not provide a force in either direction. In this example, the pressurized pneumatic chamber 570 is forward of the piston retainer 520 and the piston 518. In some examples, this is beneficial because there is additional space forward of these components. In other examples, however, the pressurized pneumatic chamber 570 can be disposed rearward of the piston 518 and the piston retainer 520.

In the example of FIG. 5, the example fan actuation system 500 is devoid of a pitch lock device and counterweights for reducing inertial loading associated with rotation of fan blades. In particular, in known fan actuation systems, a separate pitch lock device is required to hold the plurality of fan blades 140 once the plurality of fan blades 140 is in the feather position. Further, in known fan actuation systems, a counterweight is used to provide additional force to help pitch the fan blades. However, with the fan actuation system 500, the pressurized pneumatic chamber 570 provides a constant biasing force to hold the plurality of fan blades 140 in the feather position, which eliminates the need for a separate pitch lock device. Further, the hydraulic system 550 provides the first pressure P1 in both the first hydraulic chamber 540 and the third hydraulic chamber 544 to provide a higher pressure to pitch the fan blades 140, which eliminates the need for a counterweight. This reduces parts, complexity, weight, and costs of the fan actuation system 500.

Examples have been disclosed herein that improve the ability for the fan actuation system 500 to move the fan blades 140 to the feather position in the event of failure of the fan actuation system 500 or a shutdown of the turbofan engine 110. The example systems disclosed herein are passive and, thus, do not require complicated activation components or control systems. The example pressurized pneumatic chamber 570 is capable of handling high rotational speeds and a large variation in operating temperatures, such as encountered during use on aircraft. The examples disclosed herein also eliminate the need for a pitch lock device. As such, the example systems can result in fewer parts, less complexity, reduced weight, and lower costs compared to known systems. The fan actuation system 500 is particularly useful in turbofan engines (e.g., the turbofan engine 110 of FIG. 1 or the turbofan engine 210 of FIG. 2) in which the space for the fan actuation system 500 is smaller as compared to turboprop engines. Components of the fan actuation system 500 can be used in combination with any of the fan actuation systems disclosed herein.

Figure 6:
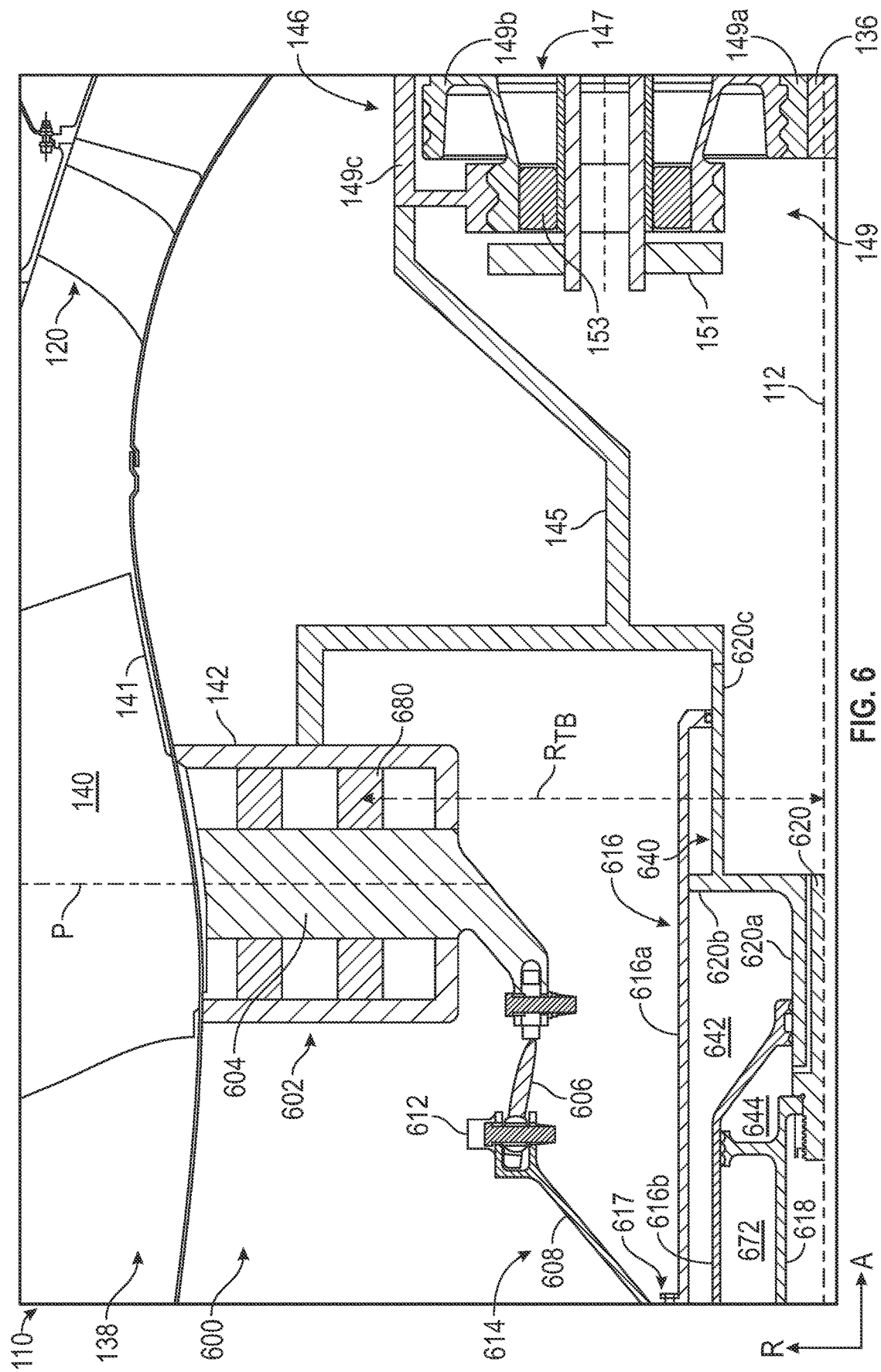
FIG. 6 is a schematic cross-sectional view of a fan actuation system for the turbofan engine, taken along the longitudinal centerline axis of the turbofan engine, according to the present disclosure.

FIG. 6 is a schematic cross-sectional view of a fan actuation system 600 for the turbofan engine 110, taken along the longitudinal centerline axis 112 of the turbofan engine 110, according to the present disclosure. While the fan actuation system 600 is described as being utilized in the turbofan engine 110, the fan actuation system 600 can be utilized in the turbofan engine 210 of FIG. 2. The fan actuation system 600 is substantially similar to the fan actuation system 500 of FIG. 5. The same reference numerals will be used for components of the fan actuation system 600 that are the same as or similar to the components of the fan actuation system 500 discussed above. The description of these components above also applies to this embodiment, and a detailed description of these components is omitted here.

The fan actuation system 600 includes a trunnion mechanism 602, a plurality of trunnions 604, a plurality of trunnion links 606, a unison ring 608, a plurality of pins 612, one or more actuators 614, a hydraulic cylinder 616, a joint 617, a piston 618, and a piston retainer 620. The hydraulic cylinder 616 has a first portion 616a and a second portion 616b. Although not shown in the view of FIG. 6, the hydraulic cylinder 616 also includes a third portion and a fourth portion similar to the third portion 516c and the fourth portion 516d of the hydraulic cylinder 516 of FIG. 5. The piston retainer 620 has a first portion 620a, a second portion 620b, and a third portion 620c. The fan actuation system 600 also includes a first hydraulic chamber 640, a second hydraulic chamber 642, a third hydraulic chamber 644, and a pressurized pneumatic chamber (not shown in the view of FIG. 6), and a chamber 672. The first hydraulic chamber 640 and the third hydraulic chamber 644 receive the hydraulic fluid at a first pressure P1, and the second hydraulic chamber 642 receives the hydraulic fluid at a second pressure P2, as detailed above with respect to FIG. 5. The fan actuation system 600 operates substantially similar as to the fan actuation system 500 of FIG. 5.

FIG. 6 shows one fan blade 140 of the fan 138, the core inlet 120, and the gearbox assembly 146. The gearbox assembly 146 includes a gear assembly 147 having a plurality of gears 149 including a first gear 149a, one or more second gears 149b secured by a planet carrier 151, and a third gear 149c. In FIG. 6, the first gear 149a is a sun gear, the one or more second gears 149b are planet gears, and the third gear 149c is a ring gear. The gear assembly 147 is an epicyclic gear assembly. When the gear assembly 147 is an epicyclic gear assembly, the one or more second gears 149b include a plurality of second gears 149b (e.g., two or more second gears 149b).

In the epicyclic gear assembly, the gear assembly 147 can be in a star arrangement or a rotating ring gear type gear assembly (e.g., the third gear 149c is rotating and the planet carrier 151 is fixed and stationary). In such an arrangement, the fan 138 is driven by the third gear 149c. For example, the third gear 149c is coupled to the fan shaft 145 such that rotation of the third gear 149c causes the fan shaft 145, and, thus, the fan 138, to rotate. In this way, the third gear 149c is an output of the gear assembly 147. However, other suitable types of gear assemblies may be employed. In one non-limiting embodiment, the gear assembly 147 is a planetary arrangement, in which the third gear 149c is held fixed, with the planet carrier 151 allowed to rotate. In such an arrangement, the fan 138 is driven by the planet carrier 151. For example, the planet carrier 151 is coupled to the fan shaft 145 such that rotation of the planet carrier 151 causes the fan shaft 145, and, thus, the fan 138, to rotate. In this way, the one or more second gears 149b (e.g., via the planet carrier 151) are the output of the gear assembly 147. In another non-limiting embodiment, the gear assembly 147 may be a differential gear assembly in which the third gear 149c and the planet carrier 151 are both allowed to rotate. While an epicyclic gear assembly is detailed herein, the gear assembly can include any type of gear assembly including, for example, a single stage gear assembly or a compound gear assembly (e.g., a gear assembly having a plurality of stages).

The plurality of gears 149 includes one or more gear bearings 153 disposed therein. For example, the one or more second gears 149b each includes one or more gear bearings 153 disposed therein. The one or more gear bearings 153 enable the plurality of gears 149 to rotate about the one or more gear bearings 153 such that the plurality of gears 149 rotates. The one or more gear bearings 153 can include any type of bearing for a gear, such as, for example, journal bearings, roller bearings, or the like. The gearbox assembly 146 can include a plurality of gear bearings that includes a forward gear bearing and an aft gear bearing. The one or more gear bearings 153 shown in the view of FIG. 6 are the forward gear bearing.

The first gear 149a is coupled to an input shaft of the turbofan engine 110. For example, the first gear 149a is coupled to the LP shaft 136 such that rotation of the LP shaft 136 causes the first gear 149a to rotate. Radially outward of the first gear 149a, and intermeshing therewith, is the one or more second gears 149b that are coupled together and supported by the planet carrier 151. The planet carrier 151 supports and constrains the one or more second gears 149b such that the each of the one or more second gears 149b is enabled to rotate about a corresponding axis of each second gear 149b without rotating about the periphery of the first gear 149a. Radially outwardly of the one or more second gears 149b, and intermeshing therewith, is the third gear 149c, which is an annular ring gear. The third gear 149c is coupled via an output shaft to the fan 138 and rotates to drive rotation of the fan 138 about the longitudinal centerline axis 112. For example, the fan shaft 145 is coupled to the third gear 149c.

The fan shaft 145 is coupled to the disk 142 such that rotation of the fan shaft 145 causes the plurality of fan blades 140 to rotate about the longitudinal centerline axis 112. The turbofan engine 110 also includes one or more thrust bearings 680 disposed between the trunnion 604 and the disk 142 such that the trunnion 604 rotates about the pitch axis P with respect to the disk 142. The one or more thrust bearings 680 transmit the load from the respective fan blade 140 to a static structure of the turbofan engine 110. The one or more thrust bearings 680 are disposed radially at a thrust bearing radius $R_{TB}$. The thrust bearing radius $R_{TB}$ is defined in the radial direction R from the longitudinal centerline axis 112 to a radial center of the one or more thrust bearings 680. The amount of space, or the volume, beneath the fan 138 that is available for the fan actuation system 600 is defined by the thrust bearing radius $R_{TB}$. The fan actuation system 600 needs to be accommodated radially below the one or more thrust bearings 680 and within the thrust bearing radius $R_{TB}$.

As mentioned earlier, the inventors sought to address the problem implementing a variable pitch actuation system within the more limited packaging space available in a turbofan engine and while accounting for the significantly higher loading environment and more numerous blades relative to a turboprop engine. By way of testing various engine architectures the inventors experimented with different configurations of the pitch actuation system, fine and coarse pitch actuators, hydraulic actuators, and bearing placement that could sustain the higher loading associated with more numerous blades, higher disk loading, and Mach speed sufficient to satisfy operational and safety requirements in the event of, e.g., loss of hydraulic pressure. Additionally, while it was possible to arrive at such a system after experiments and testing, there was a challenge to determine how to fit the system within a comparatively more limited space of a turbofan engine.

During the course of evaluating the different embodiments as set forth herein, with the goal of providing the necessary force to pitch the fan blades, taking due account for the number of blades, accounting for loss in fluid pressure or generally lost power conditions, aerodynamic performance, cooling, aeromechanics, and disc loading/fan blade loading, etc., the inventors had discovered there was indeed much less space available for this system to operate as required for the engine's pitch actuation system. After evaluating several different architectures of pitch change mechanisms (with and without counterweight, oil transfer devices, fine and coarse pitch system, torque transfer load path for pitching blades and delivery of shaft power from gearbox, etc.—both for a ducted engine and an open fan engine—it was discovered, unexpectedly, that there is a relationship among the number of fan blades, the fan tip diameter $D_{FT}$, the cruise Mach number, and the thrust bearing radius $R_{TB}$ capable of differentiating an architecture that satisfies operational and packaging requirements from an architecture that does not satisfy these requirements. This relationship moreover is capable of uniquely identifying a finite and readily ascertainable number of embodiments suitable for a particular architecture that accounts for the size and the loading requirements needed to pitch the fan blades without overly sacrificing the aerodynamic performance, cooling aeromechanics, and load margins on the fan blades. For example, the cruise Mach number was not expected to be a significant factor, but as discussed further below, the cruise Mach number was found to be a factor and particularly in conjunction with fan diameter at higher Mach numbers. The inventors submit that the relationship enables one to select a size for the fan pitch actuation system that can reduce the size and the weight of the fan pitch actuation system, while accounting for the factors discussed above. The inventors further submit that the relationship can help identify an improved fan efficiency, or penalties to efficiency by choosing one fan pitch actuation system architecture over another. This relationship is referred to as a fan actuation system (FAS) envelope, in relationship (1):

$$FAS \text{ envelope} = \frac{N_{FB} \times D_{FT} \times M_{cruise}}{\left(\frac{R_{TB}}{N_{FB}}\right)} \quad (1)$$

$N_{FB}$ is the number of fan blades of the fan, $D_{FT}$ is the fan tip diameter, $M_{cruise}$ is the Mach number at cruise (mid-level power operation), and $R_{TB}$ is the thrust bearing radius. $N_{FB} \times D_{FT} \times M_{cruise}$ is referred to as a loading envelope, and $R_{TB}/N_{FB}$ is referred to as a spacing envelope. Accordingly, the FAS envelope is given by the loading envelope divided by the spacing envelope.

As discussed further below, the inventors identified a range for the FAS envelope that enables a fan actuation system design for different turbofan engine architectures that accounts for the integrity/reliability of load paths needed to pitch the fan blades within the space constraints imposed by a turbofan engine (vs. a turboprop's space constraints). Fan pitch actuation system architectures that fall within this range are believed to satisfy packaging requirements for a turbofan engine, while those architectures that do not fall within the FAS range are believed to not satisfy the packaging requirements, which indicate that the system would be unacceptably large and not result in an aircraft engine that met aero efficiency and weight requirements (i.e., an undesirable engine architecture). Using this unique relationship, the size of the fan actuation system can be selected to achieve a more compact fan pitch actuation system for a turbofan engine. Using the FAS envelope as a guide, a fan pitch actuation system can be developed that takes into account the loading associated with pitching of the fan blades based on the size of the fan blades, the number of fan blades, the size of thrust bearing, and the cruise Mach number, which factors were found—as a result of the extensive number of architectures considered for different thrust class engines, some successful and some not successful—to largely define the packaging size needed to accommodate a pitch actuation system capable of handling the fan loading environment.

Table 1 represents exemplary embodiments 1 to 14 and their corresponding FAS envelope values for various turbofan engines at various cruise Mach numbers. Embodiments 1 to 14 may represent the turbofan engine 110 of FIG. 1 (e.g., ducted engine) or the turbofan engine 210 of FIG. 2 (e.g., unducted fan engine) and can be applied to any of the pitch actuation systems detailed herein. In particular, embodiments 7, 9, and 13 are ducted engines (e.g., such as the turbofan engine 110 of FIG. 1), and embodiments 1 to 6, 8, 10 to 12, and 14 are unducted fan engines (e.g., such as the turbofan engine 210 of FIG. 2). In Table 1, the FAS envelope values were determined based on relationship (1) described above and using fan tip diameters $D_{FT}$ and thrust bearing radiuses $R_{TB}$ in inches.

TABLE 1

| Emb. | Number of Fan Blades, $N_{FB}$ | Fan Tip Diameter, $D_{FT}$ (in.) | Thrust Bearing Radius, $R_{TB}$ (in.) | Cruise Mach Number, $M_{cruise}$ | FAS Envelope |
|---|---|---|---|---|---|
| 1 | 12 | 156.0 | 26.9 | 0.8 | 668 |
| 2 | 14 | 156.0 | 24.9 | 0.8 | 982 |
| 3 | 14 | 154.0 | 24.7 | 0.8 | 978 |
| 4 | 14 | 153.8 | 24.3 | 0.8 | 992 |
| 5 | 14 | 164.3 | 24.6 | 0.8 | 1047 |
| 6 | 14 | 110.4 | 19.5 | 0.8 | 888 |
| 7 | 12 | 88.7 | 19.0 | 0.9 | 605 |
| 8 | 10 | 120.0 | 14.8 | 0.9 | 730 |
| 9 | 10 | 84.0 | 14.0 | 0.75 | 450 |
| 10 | 18 | 168.0 | 27.0 | 0.9 | 1814 |
| 11 | 10 | 120 | 14.0 | 0.8 | 686 |
| 12 | 14 | 168.0 | 19.0 | 0.88 | 1525 |
| 13 | 10 | 84.0 | 19.0 | 0.8 | 354 |
| 14 | 14 | 120.0 | 27.0 | 0.88 | 767 |

The FAS envelope is valid for an engine with fan blades $N_{FB}$ in a range of from ten to eighteen for a ducted engine, and from ten to fourteen for an open fan engine. The number of fan blades $N_{FB}$ affects the volume (e.g., amount of space) circumscribed by the fan blades. Increasing the number of fan blades $N_{FB}$ increases the amount of airflow that the fan can produce for a particular fan tip diameter and fan rotation speed, but a higher $N_{FB}$ also reduces the tangential distance $T_{FB}$ between fan blades at the fan hub, which impacts the available space for pitch actuation of each individual blade, referring to the space needed per blade for pitch levers, gearing, oil transfer devices, related mechanisms for pitching fan blades and size of load bearing parts of the trunnion and related supporting structure capable of carrying the fan blade loads. This space is at a premium because with an increased number of fan blades the loading capability per blade needs to be satisfied within a smaller space compared to an engine with fewer blades (e.g., such as a turboprop engine). The FAS envelope value accounts for the number of fan blades $N_{FB}$ selected to increase the amount of airflow but without imposing an unrealistically narrow tangential fan blade distance $T_{FB}$ between adjacent fan blades in order to fit within the desired packaging envelope.

The FAS envelope is valid for a fan tip diameter $D_{FT}$ in a range of eighty-four inches to one hundred sixty-eight inches (84.0 in. to 168.0 in.). The fan tip diameter $D_{FT}$ also affects the volume needed for supporting the fan blades during operation. Increasing the fan tip diameter $D_{FT}$ increases the fan tip speed for a given rotational speed and therefore the load that needs to get reacted at the trunnion, and torque needed in the pitching mechanism for pitching the blade. The radial spacing between blades and within the volume circumscribed by the fan blades (e.g., within the space circumscribed by the thrust bearings) decreases, thereby decreasing the volume beneath the fan and providing less space for the load bearing structure that can react the blade loads. Furthermore, as the bearing radius $R_{TB}$ is extended out, the structure supporting the blade at its root needs to be capable of sustaining higher loads because the blade is disposed further from the fan rotation axis. The more robust root results in a larger fan disk, further providing less space underneath the fan for the fan actuation system. In view of these weight and size considerations, as well as the ability to install such fan blades and fans without resulting in unacceptable aero efficiency penalties, the inventors determined that a fan tip diameter $D_{FT}$ should be less than one hundred sixty-eight inches (168.0 in.). The fan tip diameter $D_{FT}$ may therefore be limited as it impacts the space available for a pitch actuation system suitable for carrying fan blade loads. The size of the fan blades in ducted engines is limited by the duct (e.g., the nacelle). In embodiments for a ducted engine (e.g., the turbofan engine 110 of FIG. 1), the fan tip diameter $D_{FT}$ is in a range of eighty-four inches to one hundred twenty inches (84.0 in. to 120.0 in.). In embodiments for an open fan engine (e.g., the turbofan engine 210 of FIG. 2), the fan tip diameter $D_{FT}$ is in a range of one hundred twenty inches to one hundred sixty-eight inches (120.0 in. to 168.0 in.).

The FAS envelope is valid for a thrust bearing radius $R_{TB}$ of fourteen inches to twenty-seven inches (14 in. to 27 in.). The thrust bearing radius $R_{TB}$ defines the amount of space, or the volume available for the fan actuation system. Increasing the thrust bearing radius $R_{TB}$ provides more space for the fan actuation system, but sacrifices aerodynamic performance by making the fan radius ratio (i.e., the ratio of the fan hub radius to the fan blade radius) larger. Decreasing the thrust bearing radius $R_{TB}$ reduces the fan radius ratio and reduces the size of the turbofan engine, but provides less space to carry the loads from the fan blades. The thrust bearing radius RTB reflects the need for adequately accommodating the diameter needed for packaging the fan actuation system but without overly sacrificing aerodynamic performance of the turbofan engine. In embodiments for a ducted engine (e.g., the turbofan engine 110 of FIG. 1), the thrust bearing radius $R_{TB}$ is in a range of fourteen inches to nineteen inches (14 in. to 19 in.). In embodiments for an open fan engine (e.g., the turbofan engine 210 of FIG. 2), the thrust bearing radius $R_{TB}$ is in a range of nineteen inches to twenty-seven inches (19 in. to 27 in).

The FAS envelope is valid cruise Mach number $M_{cruise}$ in a range of 0.7 to 0.9. As mentioned above, turbofan engines operate at higher cruise speeds than turboprop engines. At higher cruise speeds, the aerodynamic loads on fan blades increase, thereby requiring more torque for actuating blades in pitch. This means a larger actuation system is needed to handle the higher reaction loads resulting when a torque is applied in flight to change the blade pitch, to move the blade to a feathered position, or coarse/fine pitch changes. The cruise Mach number $M_{cruise}$ reflects this higher loading environment when pitching fan blades. In some embodiments, the cruise Mach number $M_{cruise}$ in a range of 0.75 to 0.9. In some embodiments, the cruise Mach number $M_{cruise}$ is in a range of 0.8 to 0.88.

Figure 7:
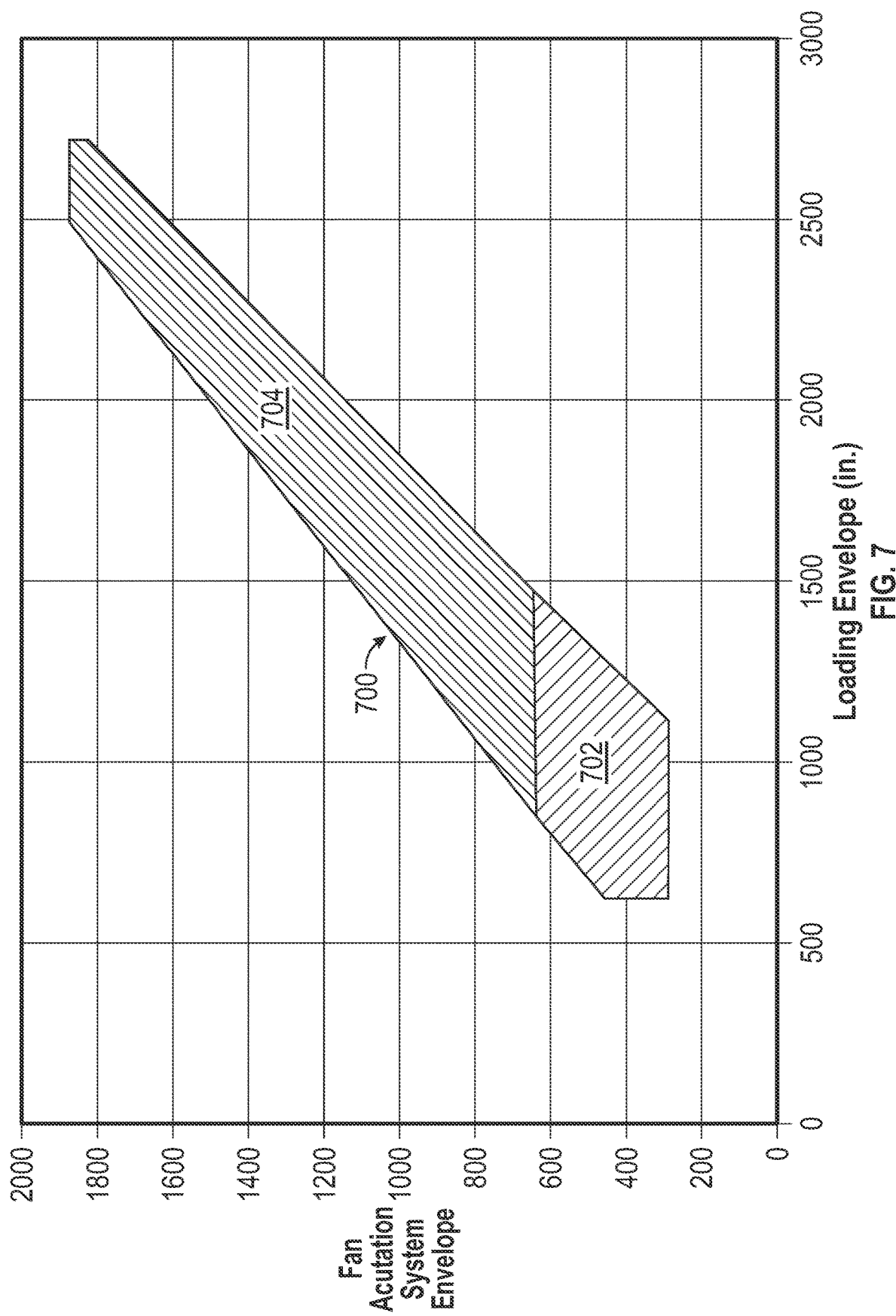
FIG. 7 represents, in graph form, a fan actuation system envelope as a function of a loading envelope, according to the present disclosure.

FIG. 7 represents, in graph form, the FAS envelope as a function of the loading envelope ($N_{FB} \times D_{FT} \times M_{cruise}$). An area 700 represents the boundaries of the FAS envelope. The FAS envelope is in a range of three hundred to one thousand eight hundred sixty (300 to 1860) for a loading envelope in a range of five hundred eighty-eight inches to two thousand seven hundred twenty-two inches (588 in. to 2722 in.). Table 1 and FIG. 7 show that the FAS envelope increases as the loading envelope increases. In this way, the FAS envelope increases as the number of fan blades $N_{FB}$, the fan tip diameter $D_{FT}$, or the cruise Mach number $M_{cruise}$ increase. The range of the FAS envelope identifies the specific architectures that can accommodate the fan pitch actuation system, accounting for both the mechanisms and structural load paths needed to pitch the fan blades under an aerodynamic loading, but without exceeding the volume available for packaging the pitch actuation system within the limited space of a turbofan engine.

A first area 702 represents the boundaries of the FAS envelope for ducted engines, such as, for example, the turbofan engine 110 of FIG. 1. A second area 704 represents the boundaries of the FAS envelope for unducted fan engines, such as, for example, the turbofan engine 210 of FIG. 2. Ducted engines tend to have more limited space for the fan actuation system due to the presence of a fan casing, fan duct, or outer nacelle. On the other hand, the fan actuation system of ducted engines are expected to experience lower loads associated with supporting fan blades and pitching fan blades due to the fan blades having a smaller diameter compared to an open fan engine. The FAS envelope, represented by the first area 702, is in a range of three hundred to six hundred sixty (300 to 660) for ducted engines. The FAS envelope, represented by the second area 704, is in a range of six hundred sixty to one thousand eight hundred sixty (660 to 1860) and, preferably, in a range of six hundred sixty to one thousand twenty (660 to 1020) and includes open fan engines.

Figure 8:
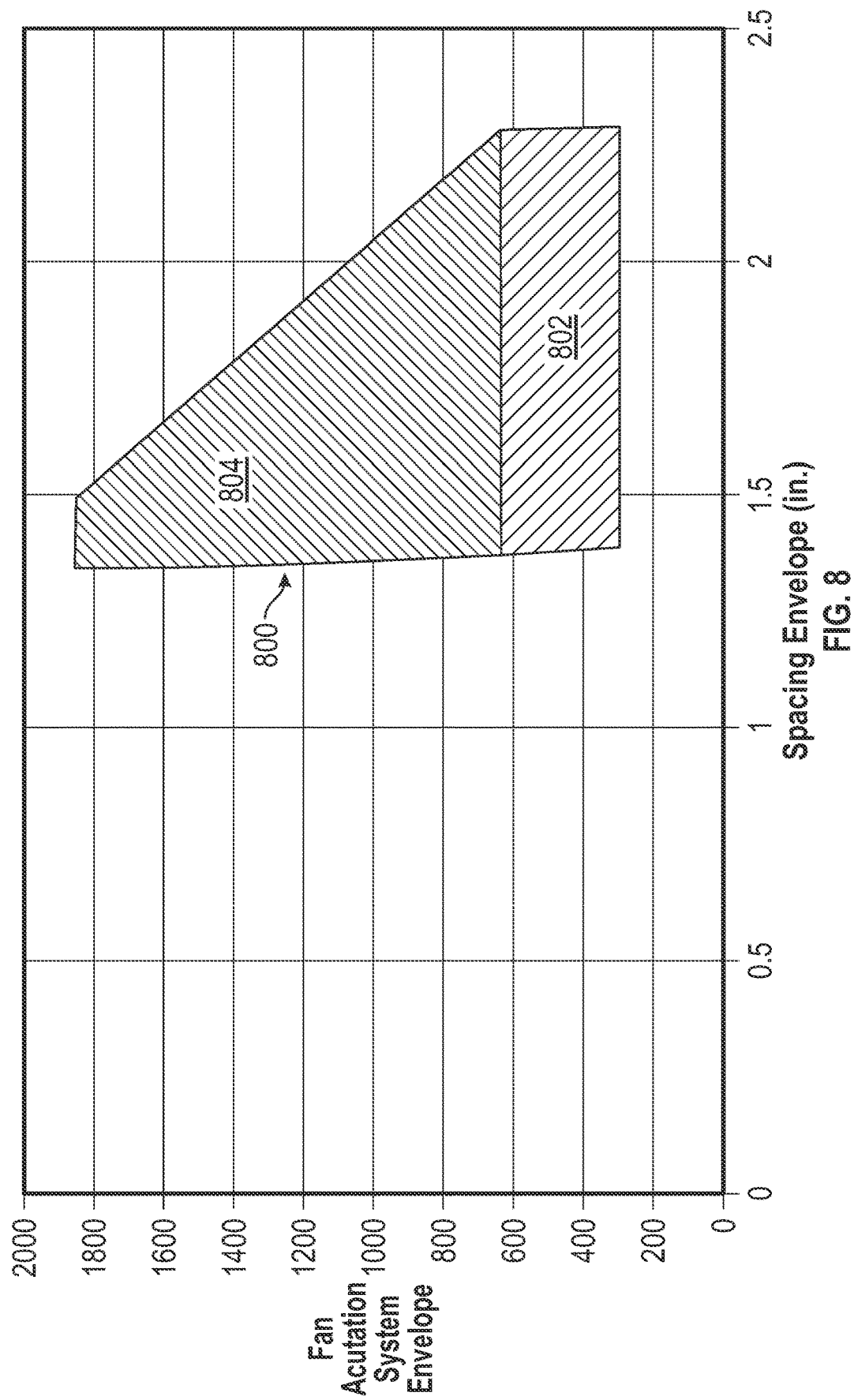
FIG. 8 represents, in graph form, the fan actuation system envelope as a function of a spacing envelope, according to the present disclosure.

FIG. 8 represents, in graph form, the FAS envelope as a function of the spacing envelope ($R_{TB}/N_{FB}$). An area 800 represents the boundaries of the FAS envelope. The FAS envelope is in a range of three hundred to one thousand eight hundred sixty (300 to 1860) for a spacing envelope in a range of one point three five inches to two point two five inches (1.35 in. to 2.25 in.). Table 1 and FIG. 8 show that the FAS envelope decreases as the spacing envelope increases. In this way, the FAS envelope decreases as the thrust bearing radius $R_{TB}$ increases or the number of fan blades $N_{FB}$ decreases. A first area 802 represents the boundaries of the FAS envelope for ducted engines, and is in a range of three hundred to six hundred sixty (300 to 660) for ducted engines, as detailed above. A second area 804 represents the boundaries of the FAS envelope for unducted fan engines, and is in a range of six hundred sixty to one thousand eight hundred sixty (660 to 1860) and, preferably, in a range of six hundred sixty to one thousand twenty (660 to 1020), as detailed above.

Further aspects are provided by the subject matter of the following clauses.

A turbofan engine comprising a fan having a plurality of fan blades, each of the plurality of fan blades being rotatable about a pitch axis, and a fan actuation system including one or more actuators for rotating the plurality of fan blades about the pitch axis and one or more thrust bearings, wherein the fan actuation system is characterized by a fan actuation system envelope in a range of 300 to 1860, the fan actuation system envelope being given by:

$$\frac{N_{FB} \times D_{FT} \times M_{cruise}}{\left(\frac{R_{TB}}{N_{FB}}\right)}$$

wherein $N_{FB}$ is a number of the plurality of fan blades, $D_{FT}$ is a fan tip diameter of the plurality of fan blades, $M_{cruise}$ is a Mach number of the turbofan engine at cruise operating conditions, and $R_{TB}$ is a thrust bearing radius of the one or more thrust bearings.

A turbofan engine comprising a fan having a plurality of fan blades, each of the plurality of fan blades being rotatable about a pitch axis, a nacelle that circumferentially surrounds the fan, and a fan actuation system including one or more actuators for rotating the plurality of fan blades about the pitch axis and one or more thrust bearings, wherein the fan actuation system is characterized by a fan actuation system envelope in a range of 300 to 660, the fan actuation system envelope being given by:

$$\frac{N_{FB} \times D_{FT} \times M_{cruise}}{\left(\frac{R_{TB}}{N_{FB}}\right)}$$

wherein $N_{FB}$ is a number of the plurality of fan blades, $D_{FT}$ is a fan tip diameter of the plurality of fan blades, $M_{cruise}$ is a Mach number of the turbofan engine at cruise operating conditions, and RTB is a thrust bearing radius of the one or more thrust bearings.

A turbofan engine comprising a fan having a plurality of fan blades, the fan being an open fan, and each of the plurality of fan blades being rotatable about a pitch axis, and a fan actuation system including one or more actuators for rotating the plurality of fan blades about the pitch axis and one or more thrust bearings, wherein the fan actuation system is characterized by a fan actuation system envelope in a range of 660 to 1860, the fan actuation system envelope being given by:

$$\frac{N_{FB} \times D_{FT} \times M_{cruise}}{\left(\frac{R_{TB}}{N_{FB}}\right)}$$

wherein $N_{FB}$ is a number of the plurality of fan blades, $D_{FT}$ is a fan tip diameter of the plurality of fan blades, $M_{cruise}$ is a Mach number of the turbofan engine at cruise operating conditions, and RTB is a thrust bearing radius of the one or more thrust bearings.

The turbofan engine of any preceding clause, wherein the fan actuation system includes a hydraulic system that supplies hydraulic fluid for rotating the plurality of fan blades about the pitch axis.

The turbofan engine of any preceding clause, wherein the cruise operating conditions occur at a mid-level power range of the turbine engine.

The turbofan engine of the preceding clause, wherein the mid-level power range is 30% to 85% of a sea level static maximum engine rated thrust for the turbine engine.

The turbofan engine of any preceding clause, wherein the turbofan engine is rated for use on a regional aircraft having a maximum takeoff thrust of 10,000 lbf to 20,000 lbf.

The turbofan engine of any preceding clause, wherein the turbofan engine is rated for use on a narrow body aircraft having a maximum takeoff thrust of 15,000 lbf to 30,000 lbf.

The turbofan engine of any preceding clause, wherein the turbofan engine is rated for use on a wide body aircraft having a maximum takeoff thrust of 40,000 lbf to 110,000 lbf.

The turbofan engine of any preceding clause, wherein $N_{FB}$ is in a range of ten to eighteen.

The turbofan engine of any preceding clause, wherein $N_{FB}$ is in a range of ten to fourteen.

The turbofan engine of any preceding clause, wherein $D_{FT}$ is in a range of 84.0 inches to 168.0 inches.

The turbofan engine of any preceding clause, wherein $D_{FT}$ is in a range of 84.0 inches to 120.0 inches.

The turbofan engine of any preceding clause, wherein $D_{FT}$ is in a range of 120.0 inches to 168.0 inches.

The turbofan engine of any preceding clause, wherein $R_{TB}$ is in a range of 14 inches to 27 inches.

The turbofan engine of any preceding clause, wherein $R_{TB}$ is in a range of 14 inches to 19 inches.

The turbofan engine of any preceding clause, wherein $R_{TB}$ is in a range of 19 inches to 27 inches.

The turbofan engine of any preceding clause, wherein $M_{cruise}$ is in a range of 0.7 to 0.9.

The turbofan engine of any preceding clause, wherein $M_{cruise}$ is in a range of 0.75 to 0.9.

The turbofan engine of any preceding clause, wherein $M_{cruise}$ is in a range of 0.8 to 0.88.

The turbofan engine of any preceding clause, wherein the fan actuation system includes a pressurized pneumatic chamber that is filled with a pressurized gas that biases the plurality of fan blades to a feather position.

The turbofan engine of any preceding clause, wherein the fan actuation system is devoid of counterweights for reducing inertial loading associated with rotation of fan blades.

The turbofan engine of any preceding clause, further comprising a turbo-engine, wherein the turbofan engine has a longitudinal centerline axis, and the turbo-engine is annular about the longitudinal centerline axis.

The turbofan engine of the preceding clause, wherein the turbo-engine includes a core inlet that is annular about the longitudinal centerline axis.

The turbofan engine of any preceding clause, further comprising a gearbox assembly, wherein the turbo-engine includes a low-pressure shaft, and the fan has a fan shaft that is coupled to the low-pressure shaft through the gearbox assembly.

The turbofan engine of the preceding clause, wherein the gearbox assembly has a gear ratio in a range 3.5:1 to 5:1 for a ducted engine.

The turbofan engine of any preceding clause, wherein the gearbox assembly has a gear ratio in a range of 4:1 and 10:1 for an unducted fan engine.

The turbofan engine of any preceding clause, wherein the low-pressure shaft, the gearbox assembly, and the fan shaft are coaxial along the longitudinal centerline axis.

The turbofan engine of any preceding clause, wherein the fan actuation system envelope is in a range of 660 to 1020.

The turbofan engine of any preceding clause, the fan actuation system envelope being in a range of 300 to 660.

The turbofan engine of any preceding clause, the fan actuation system envelope being in a range of 660 to 1860.

The turbofan engine of any preceding clause, the fan actuation system envelope being in a range of 660 to 1020.

The turbofan engine of any preceding clause, further comprising a nacelle that circumferentially surrounds the fan.

The turbofan engine of any preceding clause, wherein the turbofan engine is an open fan engine.

The turbofan engine of any preceding clause, further comprising a fan hub, the plurality of fan blades extending radially from the fan hub.

The turbofan engine of any preceding clause, the fan actuation system being disposed within the fan hub.

The turbofan engine of any preceding clause, the turboengine comprising a compressor section, a combustor, and a turbine section.

The turbofan engine of any preceding clause, the compressor section including a low-pressure compressor and a high-pressure compressor, and the turbine section including a high-pressure turbine and a low-pressure turbine.

The turbofan engine of any preceding clause, further comprising a high-pressure shaft that couples the high-pressure compressor and the high-pressure turbine.

The turbofan engine of any preceding clause, further comprising a low-pressure shaft that couples the low-pressure compressor and the low-pressure turbine.

The turbofan engine of any preceding clause, the low-pressure shaft being disposed through the high-pressure shaft.

The turbofan engine of any preceding clause, the gearbox assembly comprising a gear assembly comprising a plurality of gears.

The turbofan engine of any preceding clause, the gearbox assembly including one or more gear bearings.

The turbofan engine of any preceding clause, each of the plurality of fan blades extending from a fan root to a fan tip.

The turbofan engine of any preceding clause, the fan tip diameter DFT being defined from the longitudinal centerline axis to the fan tip of each of the plurality of fan blades.

The turbofan engine of any preceding clause, the fan actuation system including a trunnion mechanism that includes a plurality of trunnions, each fan blade being disposed in a respective trunnion.

The turbofan engine of any preceding clause, the fan blades extending from a disk.

The turbofan engine of any preceding clause, the disk including a plurality of disk segments.

The turbofan engine of any preceding clause, each fan blade being coupled to a respective disk segment at the trunnion mechanism.

The turbofan engine of any preceding clause, the plurality of trunnions being rotatable to rotate the plurality of fan blades about the pitch axis.

The turbofan engine of any preceding clause, the fan actuation system including one or more actuators coupled to the plurality of trunnions.

The turbofan engine of any preceding clause, the fan actuation system including a plurality of trunnion links and a unison ring, the plurality of trunnion links being coupled to the plurality of trunnions and to the unison ring.

The turbofan engine of any preceding clause, the plurality of trunnion links including a plurality of forward trunnion links and a plurality of aft trunnion links.

The turbofan engine of any preceding clause, the unison ring including a plurality of unison rings including a forward unison ring that is positioned forward of the plurality of trunnions and an aft unison ring that is disposed aft of the plurality of trunnions.

The turbofan engine of any preceding clause, the plurality of forward trunnion links being coupled to the forward unison ring.

The turbofan engine of any preceding clause, the plurality of aft trunnion links being coupled to the aft unison ring.

The turbofan engine of any preceding clause, further comprising a plurality of pins that couple the plurality of trunnion links to the unison ring.

The turbofan engine of any preceding clause, the plurality of forward trunnion links being coupled to the forward unison ring by a plurality of forward pins.

The turbofan engine of any preceding clause, the plurality of aft trunnion links being coupled to the aft unison ring by a plurality of aft pins.

The turbofan engine of any preceding clause, the one or more actuators including a hydraulic cylinder and a piston disposed within the hydraulic cylinder.

The turbofan engine of the preceding clause, the hydraulic cylinder and the piston being movable along an axial direction.

The turbofan engine of any preceding clause, the forward unison ring being coupled to the hydraulic cylinder such that the forward unison ring moves when the hydraulic cylinder moves.

The turbofan engine of any preceding clause, the aft unison ring being coupled to the piston such that the aft unison ring moves as the piston moves.

The turbofan engine of any preceding clause, the fan actuation system rotating the plurality of fan blades between a first end position and a second end position.

The turbofan engine of any preceding clause, the first end position being a feather position in which the plurality of fan blades is substantially aligned with a flow of a volume of air across the plurality of fan blades.

The turbofan engine of the preceding clause, the fan actuation system rotating the plurality of fan blades to any position between the first end position and the second end position.

The turbofan engine of any preceding clause, the second end positioned being a reverse position in which the plurality of fan blades exceeds a plane that is transverse to the longitudinal centerline axis by at least 30° to assist with braking the aircraft.

The turbofan engine of any preceding clause, the fan actuation system moving the hydraulic cylinder in a first direction and moving the piston in a second direction.

The turbofan engine of any preceding clause, movement of the hydraulic cylinder and the piston causing the plurality of fan blades to rotate about the pitch axis.

The turbofan engine of any preceding clause, the one or more actuators including a piston retainer.

The turbofan engine of the preceding clause, the piston retainer being coupled to the fan shaft such that the piston retainer rotates with the fan shaft.

The turbofan engine of any preceding clause, the piston being coupled to the piston retainer such that the piston rotates with the piston retainer.

The turbofan engine of any preceding clause, the hydraulic cylinder being axially slidable with respect to the piston and the piston retainer.

The turbofan engine of any preceding clause, the piston retainer comprising a first portion, a second portion that extends radially outward from the first portion, and a third portion that extends axially from the second portion.

The turbofan engine of any preceding clause, the third portion of the piston retainer being coupled to the fan shaft.

The turbofan engine of any preceding clause, the piston being coupled to, and extending forward from, the first portion of the piston retainer.

The turbofan engine of any preceding clause, the hydraulic cylinder being disposed radially outward of the piston retainer and the piston.

The turbofan engine of any preceding clause, the hydraulic cylinder being coupled to the unison ring at a joint such that movement of the hydraulic cylinder in the axial direction causes the plurality of fan blades to pitch about the pitch axis.

The turbofan engine of any preceding clause, the hydraulic cylinder having a first portion, a second portion, a third portion, and a fourth portion.

The turbofan engine of the preceding clause, the first portion of the hydraulic cylinder extending generally in the axial direction and being coupled to the unison ring at the joint.

The turbofan engine of any preceding clause, the second portion of the hydraulic cylinder being disposed radially inward of the first portion and being coupled to the first portion and to the unison ring at the joint.

The turbofan engine of any preceding clause, the third portion of the hydraulic cylinder extending forward from the joint.

The turbofan engine of any preceding clause, the fourth portion of the hydraulic cylinder being coupled to, and extending axially within, the third portion of the hydraulic cylinder.

The turbofan engine of any preceding clause, the first portion of the hydraulic cylinder being sealingly engaged with the third portion of the piston retainer.

The turbofan engine of any preceding clause, the second portion of the piston retainer being sealingly engaged with the first portion of the hydraulic cylinder.

The turbofan engine of any preceding clause, the piston being sealingly engaged with the second portion and the fourth portion of the hydraulic cylinder.

The turbofan engine of any preceding clause, the fan actuation system including one or more hydraulic chambers defined between the hydraulic cylinder, the piston, and the piston retainer.

The turbofan engine of the preceding clause, the one or more hydraulic chambers including a first hydraulic chamber, a second hydraulic chamber, and a third hydraulic chamber.

The turbofan engine of any preceding clause, the first hydraulic chamber being defined between first portion of the hydraulic cylinder, the second portion of the piston retainer, and the third portion of the piston retainer.

The turbofan engine of any preceding clause, the second hydraulic chamber being defined between the first portion of the hydraulic cylinder, the second portion of the hydraulic cylinder, the first portion of the piston retainer, and the second portion of the piston retainer.

The turbofan engine of any preceding clause, the third hydraulic chamber being defined between the second portion of the hydraulic cylinder, an aft end of the piston, and the first portion of the piston retainer, The turbofan engine of any preceding clause, the first hydraulic chamber and the third hydraulic chamber being supplied with a hydraulic fluid at a first pressure, and the second hydraulic chamber being supplied with the hydraulic fluid at a second pressure.

The turbofan engine of any preceding clause, the first pressure and the second pressure being increased or decreased to cause the hydraulic cylinder to move axially forward or axially rearward to rotate the plurality of fan blades about the pitch axis.

The turbofan engine of any preceding clause, the fan actuation system comprising a hydraulic system that supplies the hydraulic fluid to the one or more hydraulic chambers.

The turbofan engine of any preceding clause, the hydraulic system including a pump to supply the hydraulic fluid to the one or more hydraulic chambers.

The turbofan engine of the preceding clause, the hydraulic system comprising an oil transfer bearing including a fixed portion with a plurality of fluid lines coupled to the pump.

The turbofan engine of the preceding clause, the oil transfer bearing including a sleeve that is rotatable about the fixed portion.

The turbofan engine of any preceding clause, the plurality of fluid lines including a first fluid line in fluid communication with the first hydraulic chamber, a second fluid line in fluid communication with the second hydraulic chamber, and a third fluid line in fluid communication the third hydraulic chamber.

The turbofan engine of any preceding clause, the plurality of fluid lines being coupled to the sleeve.

The turbofan engine of any preceding clause, the first hydraulic chamber and the third hydraulic chamber being provided with the hydraulic fluid at the same first pressure.

The turbofan engine of any preceding clause, the pump supplying the hydraulic fluid to the first hydraulic chamber and the third hydraulic chamber to increase the first pressure P1 and supplying the hydraulic fluid to the second hydraulic chamber to decrease the second pressure P2, to move the hydraulic cylinder in the rearward direction to rotate the plurality of fan blades towards the reverse position.

The turbofan engine of any preceding clause, the pump supplying the hydraulic fluid to the second hydraulic chamber to increase the second pressure P2 and supplying the hydraulic fluid to the first hydraulic chamber and the third hydraulic chamber to decrease the first pressure P1, to move the hydraulic cylinder in the forward direction to rotate the plurality of fan blades towards the feather position.

The turbofan engine of any preceding clause, the one or more actuators further comprising a pressurized pneumatic chamber filled with a pressurized gas to bias the hydraulic cylinder to move the plurality of fan blades to the feather position.

The turbofan engine of any preceding clause, a pressure of the pressurized gas in the pressurized pneumatic chamber being in a range of 720 psi to 920 psi.

The turbofan engine of any preceding clause, the pressurized gas in the pressurized pneumatic chamber causing the hydraulic cylinder to move rearward when the hydraulic system or the turbofan engine fails or is shut down.

The turbofan engine of any preceding clause, the fan actuation system not including a pitch lock device.

The turbofan engine of any preceding clause, the one or more thrust bearings being disposed between the plurality of trunnions and the disk such that the plurality of trunnions rotates with respect to the disk to rotate the plurality of fan blades about the pitch axis.

The turbofan engine of any preceding clause, the one or more thrust bearings transmitting a load from the plurality of fan blades to a static structure of the turbofan engine.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A turbofan engine comprising:
   a fan having a plurality of fan blades, the fan being an open fan, and each of the plurality of fan blades being rotatable about a pitch axis; and
   a fan actuation system including one or more actuators for rotating the plurality of fan blades about the pitch axis and one or more thrust bearings, wherein the fan actuation system is characterized by a fan actuation system envelope in a range of 660 to 1860, the fan actuation system envelope being given by:

$$\frac{N_{FB} \times D_{FT} \times M_{cruise}}{\left(\frac{R_{TB}}{N_{FB}}\right)}$$

wherein $N_{FB}$ is a number of the plurality of fan blades, $D_{FT}$ is a fan tip diameter of the plurality of fan blades in a range of 120.0 inches to 168.0 inches, $M_{cruise}$ is a Mach number of the turbofan engine at cruise operating conditions, and $R_{TB}$ is a thrust bearing radius of the one or more thrust bearings in a range of 20 inches to 27 inches.

2. The turbofan engine of claim 1, wherein the fan actuation system includes a hydraulic system that supplies hydraulic fluid for rotating the plurality of fan blades about the pitch axis.

3. The turbofan engine of claim 1, wherein $N_{FB}$ is in a range of ten to fourteen.

4. The turbofan engine of claim 1, wherein $M_{cruise}$ is in a range of 0.7 to 0.9.

5. The turbofan engine of claim 4, wherein $M_{cruise}$ is in a range of 0.75 to 0.9.

6. The turbofan engine of claim 4, wherein $M_{cruise}$ is in a range of 0.8 to 0.88.

7. The turbofan engine of claim 1, wherein the fan actuation system includes a pressurized pneumatic chamber that is filled with a pressurized gas that biases the plurality of fan blades to a feather position.

8. The turbofan engine of claim 7, wherein the fan actuation system is devoid of counterweights for reducing inertial loading associated with rotation of the plurality of fan blades.

9. The turbofan engine of claim 1, further comprising a turbo-engine having a core inlet, wherein the turbofan engine has a longitudinal centerline axis, and the core inlet is annular about the longitudinal centerline axis.

10. The turbofan engine of claim 9, further comprising a gearbox assembly, wherein the turbo-engine includes a low-pressure shaft, and the fan has a fan shaft that is coupled to the low-pressure shaft through the gearbox assembly.

11. The turbofan engine of claim 10, wherein the gearbox assembly has a gear ratio in a range of 4:1 and 12:1 for an unducted fan engine.

12. The turbofan engine of claim 10, wherein the low-pressure shaft, the gearbox assembly, and the fan shaft are coaxial along the longitudinal centerline axis.

13. The turbofan engine of claim 10, wherein the turbo-engine further includes a high-pressure shaft, the low-pressure shaft being disposed through the high-pressure shaft.

14. The turbofan engine of claim 1, wherein the fan actuation system is devoid of a pitch lock device for locking a pitch of the plurality of fan blades.

15. The turbofan engine of claim 1, wherein the fan actuation system includes a trunnion mechanism having a plurality of trunnions, the plurality of fan blades extending from a disk and being disposed within the plurality of trunnions.

16. The turbofan engine of claim 15, wherein the one or more thrust bearings are disposed between the plurality of trunnions and the disk such that the plurality of trunnions rotates with respect to the disk to rotate the plurality of fan blades about the pitch axis.

17. A turbofan engine comprising:
    a fan having a plurality of fan blades coupled to a fan shaft, the fan being an open fan, and each of the plurality of fan blades being rotatable about a pitch axis;
    a turbo-engine having a core inlet and including a low-pressure shaft, wherein the turbofan engine has a longitudinal centerline axis, and the core inlet is annular about the longitudinal centerline axis;
    a gearbox assembly, the fan shaft that being coupled to the low-pressure shaft through the gearbox assembly, wherein the low-pressure shaft, the gearbox assembly, and the fan shaft are coaxial along the longitudinal centerline axis; and
    a fan actuation system including one or more actuators for rotating the plurality of fan blades about the pitch axis and one or more thrust bearings, wherein the fan actuation system is characterized by a fan actuation system envelope in a range of 660 to 1860, the fan actuation system envelope being given by:

$$\frac{N_{FB} \times D_{FT} \times M_{cruise}}{\left(\frac{R_{TB}}{N_{FB}}\right)}$$

wherein $N_{FB}$ is a number of the plurality of fan blades in a range of ten to fourteen, $D_{FT}$ is a fan tip diameter of the plurality of fan blades in a range of 120.0 inches to 168.0 inches, $M_{cruise}$ is a Mach number of the turbofan engine at cruise operating conditions, and $R_{TB}$ is a thrust bearing radius of the one or more thrust bearings in a range of 20 inches to 27 inches.

18. The turbofan engine of claim 17, wherein the fan actuation system includes a hydraulic system that supplies hydraulic fluid for rotating the plurality of fan blades about the pitch axis.

19. The turbofan engine of claim 17, wherein $M_{cruise}$ is in a range of 0.7 to 0.9.

20. The turbofan engine of claim 17, wherein the fan actuation system includes a pressurized pneumatic chamber that is filled with a pressurized gas that biases the plurality of fan blades to a feather position.

* * * * *